(12) United States Patent
Sugiyama et al.

(10) Patent No.: US 10,830,587 B2
(45) Date of Patent: Nov. 10, 2020

(54) INCLINATION MEASURING DEVICE

(71) Applicant: OMRON CORPORATION, Kyoto (JP)

(72) Inventors: Kosuke Sugiyama, Nantan (JP); Norihiro Tomago, Ayabe (JP); Takahiro Suga, Fukuchiyama (JP); Hiroaki Takimasa, Ayabe (JP); Kenichi Matoba, Otsu (JP)

(73) Assignee: OMRON CORPORATION, Kyoto (JP)

( * ) Notice: Subject to any disclaimer, the term of this patent is extended or adjusted under 35 U.S.C. 154(b) by 398 days.

(21) Appl. No.: 15/795,314

(22) Filed: Oct. 27, 2017

(65) Prior Publication Data

US 2018/0216933 A1 Aug. 2, 2018

(30) Foreign Application Priority Data

Jan. 31, 2017 (JP) ................................. 2017-016236

(51) Int. Cl.
*G01C 9/06* (2006.01)
*B23Q 17/24* (2006.01)
*G05B 19/402* (2006.01)

(52) U.S. Cl.
CPC ........... *G01C 9/06* (2013.01); *B23Q 17/2428* (2013.01); *G05B 19/402* (2013.01);
(Continued)

(58) Field of Classification Search
None
See application file for complete search history.

(56) References Cited

U.S. PATENT DOCUMENTS 6,094,268 A * 7/2000 Oshida .................. G03F 9/7049
250/548
2003/0042493 A1* 3/2003 Kazakevich ......... A61B 1/0607
257/98

(Continued)

FOREIGN PATENT DOCUMENTS

CN 1582383 A 2/2005
CN 202083389 U 12/2011

(Continued)

OTHER PUBLICATIONS

A Chinese Office Action (CNOA) dated Sep. 29, 2019 in a counterpart Chinese patent application.

(Continued)

*Primary Examiner* — Isam A Alsomiri
*Assistant Examiner* — Amir J Askarian
(74) *Attorney, Agent, or Firm* — Metrolex IP Law Group, PLLC

(57) ABSTRACT

Provided is an inclination measuring device with excellent convenience.
An inclination measuring device includes: an optical system (sensor head) configured to irradiate a measurement object with an irradiated light ray from a light source and receive a reflected light ray from a measurement surface; a light receiving unit including at least one spectroscope configured to separate the reflected light ray into wavelength components, and a detector in which a plurality of light receiving elements are disposed; a light guide including a plurality of cores; and a processor configured to calculate an inclination angle of the measurement surface based on reflected light rays with respect to a plurality of irradiated light rays with which a plurality of positions on the measurement surface are irradiated.

10 Claims, 16 Drawing Sheets

(52) U.S. Cl.
CPC .... *B23Q 2717/00* (2013.01); *G01C 2009/066* (2013.01); *G05B 2219/50032* (2013.01)

(56) References Cited

U.S. PATENT DOCUMENTS

| | | | |
|---|---|---|---|
| 2004/0238727 | A1 | 12/2004 | Kokubo et al. |
| 2008/0259310 | A1* | 10/2008 | Wada ................. G01C 3/06 356/3.11 |
| 2009/0056156 | A1 | 3/2009 | Hellstrom et al. |
| 2012/0050723 | A1* | 3/2012 | Emtman ............ G01B 11/026 356/123 |
| 2015/0260504 | A1* | 9/2015 | Schonleber ........ G01B 9/02091 356/478 |
| 2016/0270506 | A1* | 9/2016 | Kafuku ................... G06T 7/73 |
| 2016/0370171 | A1* | 12/2016 | Bridges ............... G01B 11/002 |
| 2018/0341009 | A1* | 11/2018 | Niclass ................ G01S 7/4816 |

FOREIGN PATENT DOCUMENTS

| | | |
|---|---|---|
| CN | 103673888 A | 3/2014 |
| CN | 103868464 A | 6/2014 |
| CN | 104995480 A | 10/2015 |
| EP | 2950039 A1 | 12/2015 |
| JP | S60-044806 A | 3/1985 |
| JP | 2002-80852 A | 3/2002 |
| JP | 2005-121370 A | 5/2005 |
| JP | 2010-286432 A | 12/2010 |
| JP | 2011-33411 A | 2/2011 |
| JP | 2012-208102 A | 10/2012 |
| KR | 10-2011-0005934 A | 1/2011 |
| TW | M458545 U1 | 8/2013 |

OTHER PUBLICATIONS

A Taiwanese Office Action dated Jul. 2, 2018 in a counterpart Taiwanese patent application.

Japanese Office Action (JPOA) dated Sep. 1, 2020 in a counterpart Japanese patent application.

* cited by examiner

| Spot-to-spot distance (μm) | Measured distance (μm) to each spot $S_n$ | | | | x-inclination angle (degrees) | y-inclination angle (degrees) |
|---|---|---|---|---|---|---|
| | $S_1$ | $S_2$ | $S_3$ | $S_4$ | | |
| 58 | 10005 | 10005 | 9995 | 9995 | 0 | 9.78 |
| 58 | 10050 | 10000 | 10000 | 10050 | 40.76 | 0 |
| 58 | 9980 | 10000 | 10020 | 10040 | 0 | −34.59 |
| 58 | 10000 | 10050 | 10005 | 10035 | −9.78 | 4.92 |
| 58 | 11000 | 9000 | 9000 | 9000 | 86.68 | 86.68 |

INCLINATION MEASURING DEVICE

CROSS-REFERENCE TO RELATED APPLICATION

This application is based on Japanese Patent Application No. 2017-016236 filed with the Japan Patent Office on Jan. 31, 2017, the entire contents of which are incorporated herein by reference.

FIELD

The present invention relates to a device for calculating an inclination angle on a measurement surface of a measurement object. The present invention especially relates to a device for calculating an inclination angle by using a confocal optical system in which, when an irradiated light ray is focused on the measurement surface, a reflected light ray from the measurement surface is focused on a detector.

BACKGROUND

Measurement devices for measuring displacement of a measurement object in a contactless manner are known as prior art. Above all, regarding measurement devices for measuring displacement by using a confocal optical system, a variety of techniques have been disclosed. For example, Japanese Unexamined Patent Publication No. 2012-208102 (published on Oct. 25, 2012) discloses a confocal measurement device that combines an objective lens and a diffraction lens to reduce variations of accuracy in measuring displacement of a measurement object due to light wavelengths. Further, a device for measuring the shape, including the unevenness, of the measurement surface of the measurement object is also known as prior art. For example, Japanese Unexamined Patent Publication No. 2005-121370 (published on May 12, 2005) discloses a surface face measuring device that slides a plurality of displacement sensors in an x-axis direction and a y-axis direction to measure the surface shape of a measurement object based on measurement results of the plurality of displacement sensors acquired by using a laser measurement device.

However, the prior art as described above has a problem where, when the measurement surface of the measurement object is not horizontal but inclined, the correct displacement cannot be measured due to the inclination. Specifically, the invention of Japanese Unexamined Patent Publication No. 2012-208102 has a problems as follows: since the inclination has an influence on light rays reflected on a plurality of positions on the measurement surface, it is not possible to appropriately measure the measurement object in view of the inclination of the measurement surface.

SUMMARY

In order to solve the above problem, an inclination measuring device according to one aspect of the present invention is an inclination measuring device including: a light source; an optical system disposed with respect to an irradiated light ray from the light source, and configured to irradiate a measurement object with the irradiated light ray and receive a reflected light ray from a measurement surface of the measurement object; a light receiving unit including at least one spectroscope configured to separate the reflected light ray received by the optical system into wavelength components, and a detector having a plurality of light receiving elements corresponding to directions of the light rays separated by the spectroscope; a light guide including a plurality of cores and configured to optically connect between the optical system and the light receiving unit; and a processor configured to calculate an inclination angle of the measurement surface against an optical axis of the irradiated light ray based on reflected light rays from a plurality of positions on the measurement surface with respect to a plurality of irradiated light rays with which the plurality of positions are irradiated. Here, the light guide including a plurality of cores may be configured to include a plurality of cores in one cable, or may be configured of a plurality of cables each including one or more cores.

In an inclination measuring device according to one aspect of the present invention, the processor calculates the inclination angle of the measurement surface based on distances between the respective plurality of positions and a light receiving surface of the optical system with respect to the reflected light rays from the respective plurality of positions, and a relative distance between the plurality of cores as to the plurality of irradiated light rays with respect to the plurality of positions.

In an inclination measuring device according to one aspect of the present invention, when the inclination angle of the measurement surface is larger than or equal to a predetermined threshold, the processor notifies a user that the inclination angle is larger than or equal to the predetermined threshold.

In an inclination measuring device according to one aspect of the present invention, when detected values in the plurality of light receiving elements are smaller than a predetermined lower limit, the processor notifies the user that the inclination angle is larger than or equal to the predetermined threshold.

In an inclination measuring device according to one aspect of the present invention, the light guide includes a plurality of cores in one cable, and the inclination angle is calculated based on relative positions of the plurality of cores.

In an inclination measuring device according to one aspect of the present invention, the plurality of cores are optically connected to a respective plurality of the light sources, and the processor causes the plurality of light sources to emit light rays sequentially one by one to irradiate the plurality of positions on the measurement surface with the irradiated light rays via the plurality of cores corresponding to the respective plurality of light sources.

An inclination measuring device according to one aspect of the present invention further includes a selection unit capable of selectively providing the irradiated light ray from the light source to each of the respective plurality of cores included in the light guide. In the inclination measuring device, the processor irradiates each of the plurality of positions on the measurement surface with the irradiated light ray via the core selected by using the selection unit.

An inclination measuring device according to one aspect of the present invention includes a plurality of the light receiving units. In the inclination measuring device, the plurality of light receiving units are connected one-to-one with the plurality of cores, and the processor calculates distances between the respective plurality of positions and the light receiving surface of the optical system with respect to the reflected light rays from the respective plurality of positions based on detected values of the plurality of light receiving elements in the plurality of detectors provided in the respective plurality of light receiving units.

In an inclination measuring device according to one aspect of the present invention, the plurality of light receiving elements are two-dimensionally disposed on a detection surface of the detector, and the processor calculates distances between the respective plurality of positions and the light receiving surface of the optical system with respect to the reflected light rays from the respective plurality of positions based on detected values of the plurality of light receiving elements.

An inclination measuring device according to one aspect of the present invention includes a plurality of the optical systems. In the inclination measuring device, the processor calculates the inclination angle of the measurement surface against the optical axis based on the reflected light rays received in the plurality of optical systems.

In an inclination measuring device according to one aspect of the present invention, based on the inclination angle of the measurement surface against the optical axis, calculated for each of the plurality of positions on the measurement surface, the processor creates a profile of the inclination angle.

A control system according to one aspect of the present invention is a control system including: the inclination measuring device according to one aspect of the present invention; and a position control device configured to control a placement relation between the inclination measuring device and a measurement object so as to cancel the inclination angle calculated in the inclination measuring device.

According to one aspect of the present invention, there is produced the effect of being able to provide an inclination measuring device with excellent convenience concerning measurement of a measurement object.

DETAILED DESCRIPTION

First Embodiment

Hereinafter, an embodiment of the present invention will be described in detail.

(Configuration of Inclination Measuring Device)

Figure 1:
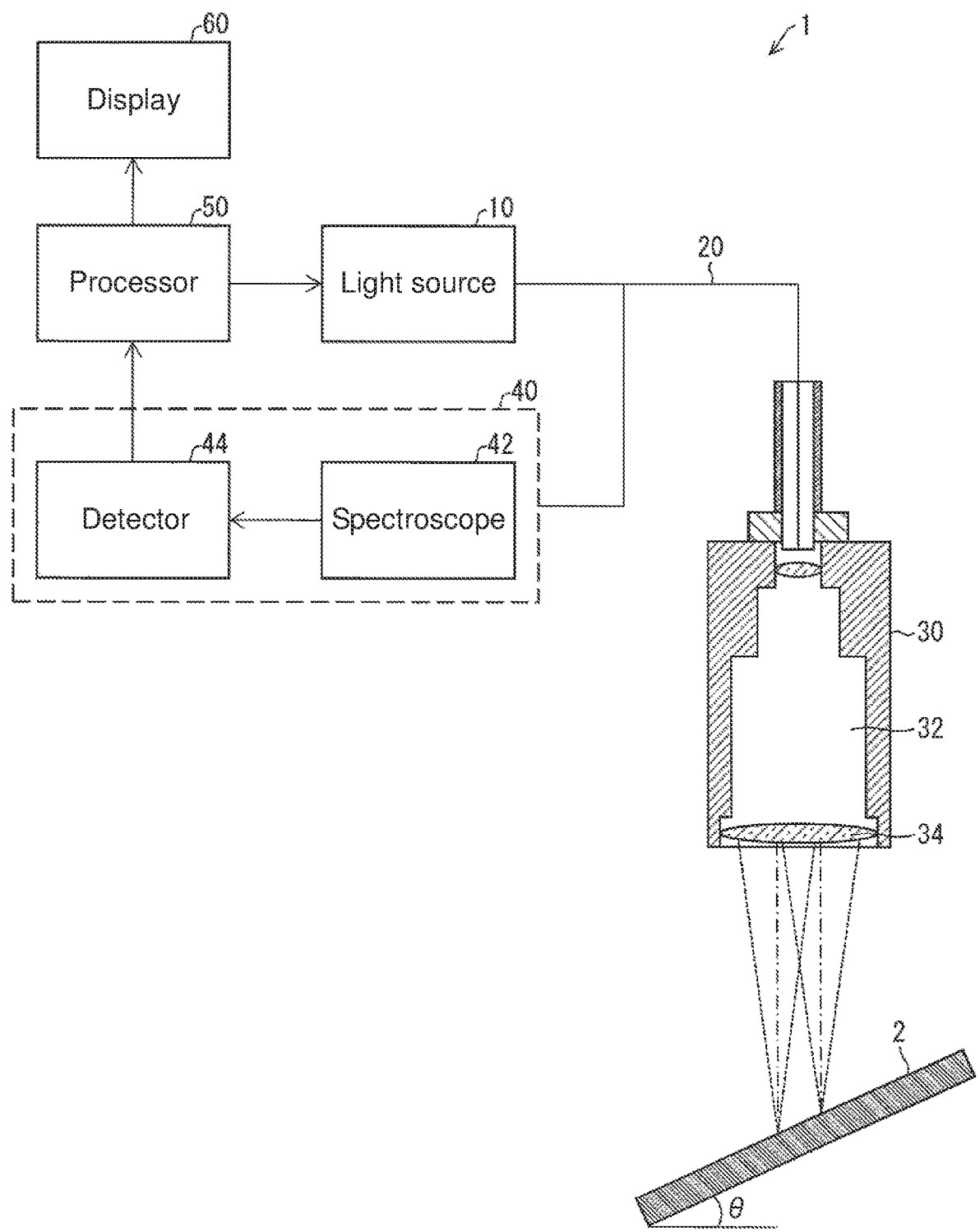
FIG. 1 is an outline view illustrating an example of an inclination measuring device according to a first embodiment of the present invention.
Figure 2:
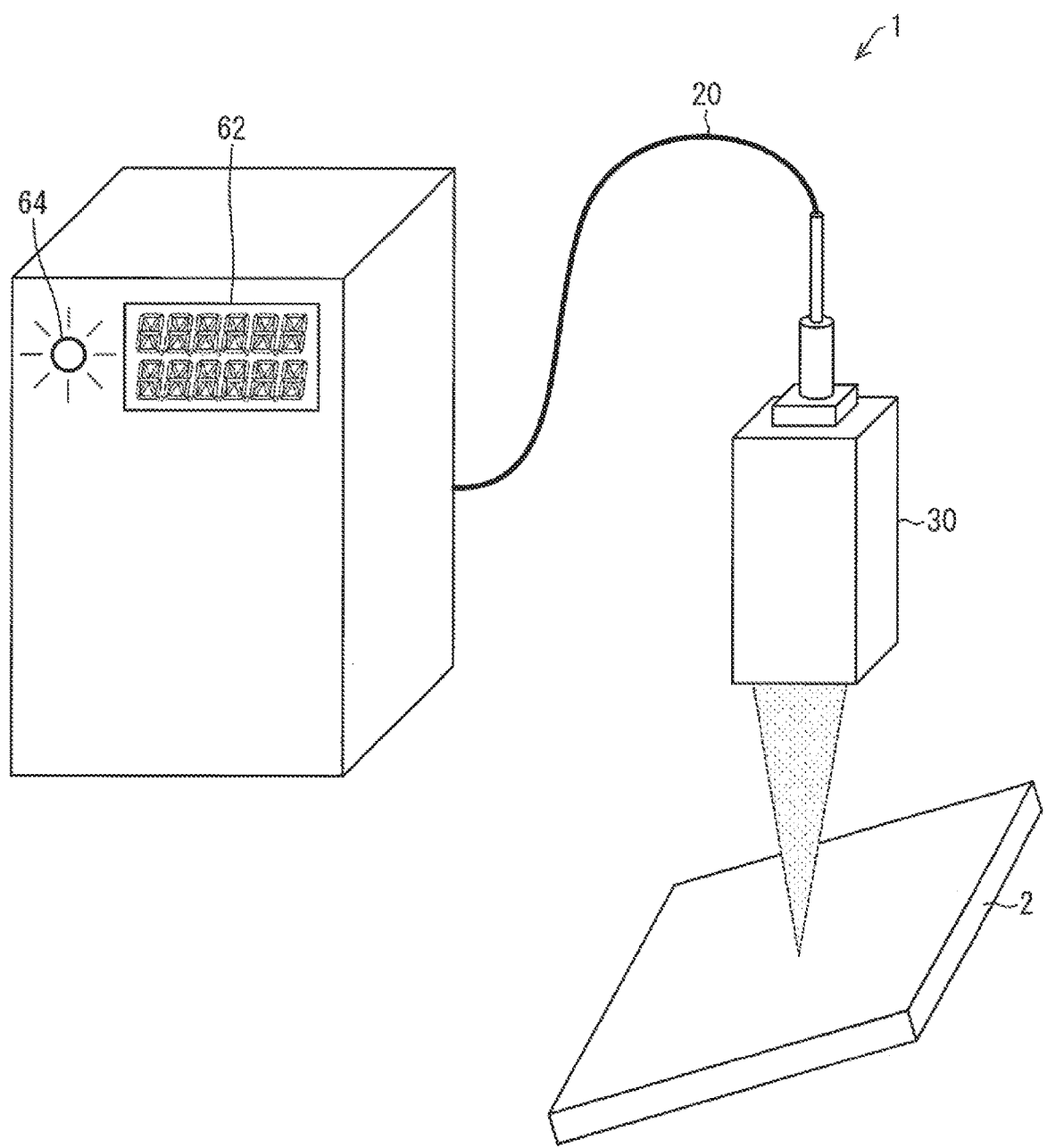
FIG. 2 is a schematic view illustrating an example of a device configuration of the inclination measuring device according to the first embodiment of the present invention.

A configuration of an inclination measuring device 1 according to the first embodiment will be described with reference to FIGS. 1 and 2. FIG. 1 is an outline view illustrating an example of the inclination measuring device 1 according to the first embodiment. FIG. 2 is a schematic view illustrating an example of the device configuration of the inclination measuring device 1 according to the first embodiment.

The inclination measuring device 1 is provided with a light source 10, a light guide 20, a sensor head 30, a light receiving unit 40, a processor 50, and a display 60. The sensor head 30 includes a chromatic aberration unit 32 and an objective lens 34, and the light receiving unit 40 includes a spectroscope 42 and a detector 44. The display 60 is provided with a display segment 62 and an inclination indicator lamp 64.

The inclination measuring device 1 projects a plurality of irradiated light rays, generated in the light source 10, to a plurality of positions (hereinafter referred to as spots) on the measurement surface of a measurement object 2. Then, based on reflected light rays from the plurality of spots, the inclination measuring device 1 can calculate an inclination angle θ of the measurement surface against an optical axis of each of the irradiated light rays. Note that in the first embodiment, the inclination measuring device 1 is an optical measurement device capable of measuring a distance between the measurement object and the sensor head 30 by a white confocal system. That is, based on a detected value obtained when the irradiated light ray is focused on the measurement surface of the measurement object 2, the inclination measuring device 1 can measure the distance between the measurement object and the sensor head 30.

The light source 10 is turned on in accordance with control by the processor 50, and irradiated light rays enter the light guide 20. For example, the light source 10 is a white LED (Light Emitting Diode).

The light guide 20 is a cable including a plurality of cores, and for example, it has a configuration of one cable including a plurality of cores. The light guide 20 can propagate the irradiated light rays generated in the light source 10 to the sensor head 30 via the plurality of built-in cores. The light guide 20 can propagate light rays, reflected on the measurement surface of the measurement object 2 and received in the sensor head 30, to the light receiving unit 40 via the plurality of built-in cores. That is, the light guide 20 is optically connected with the light source 10 and the sensor head 30. A detailed configuration of the light guide 20 including the plurality of cores will be described later.

The sensor head 30 can converge the irradiated light rays from the light source 10 by the objective lens 34, and then irradiate the measurement object 2 with the irradiated light rays. The sensor head 30 can receive reflected light rays reflected on the measurement surface of the measurement object 2, to propagate those light rays to the light guide 20. That is, the sensor head 30 operates as an optical system disposed with respect to the irradiated light rays from the light source 10 to irradiate the measurement surface of the measurement object 2 with the irradiated light rays and receive the reflected light rays from the measurement surface of the measurement object 2. More specifically, the sensor head 30 can irradiate the measurement object 2 with a plurality of irradiated light rays via the plurality of cores provided in the light guide 20, to propagate the reflected light rays to the light receiving unit 40 via the plurality of cores.

The chromatic aberration unit 32 is a unit for generating axial chromatic aberration in the irradiated light ray from the light source 10. By passage of the irradiated light ray through the chromatic aberration unit 32, chromatic aberration occurs in the irradiated light ray on the optical axis. Thereby, a focal position of the irradiated light ray from the objective lens 34 differs for each wavelength on the optical axis.

The objective lens 34 converges the irradiated light rays passing through the chromatic aberration unit 32 and irradiates the measurement object 2 with the irradiated light rays. The objective lens 34 receives the reflected light rays reflected on the measurement surface of the measurement object 2. In the first embodiment, axial chromatic aberration occurs by the action of the chromatic aberration unit 32 in the irradiated light rays, with which the measurement object 2 is irradiated via the objective lens 34. Hence only a light ray having a specific wavelength among light rays having a plurality of wavelengths included in the irradiated light ray can be focused on the measurement surface.

The light receiving unit 40 receives the reflected light rays having entered the sensor head 30. The light receiving unit 40 can separate the reflected light ray into wavelength components, to detect the intensity of each wavelength component. The light receiving unit 40 can transmit the detection result to the processor 50.

The spectroscope 42 can separate each of the plurality of reflected light rays, coming via the plurality of cores in the light guide 20, into wavelength components. The spectroscope 42 propagates the reflected light ray after the separation to the detector 44. For example, the spectroscope 42 may be a diffraction grating. Alternatively, the spectroscope 42 may be any device other than the diffraction grating which can separate the reflected light ray into wavelength components.

The detector 44 detects the intensity of the reflected light ray for each wavelength component, the reflected light ray having been separated by the spectroscope 42 into wavelength components. Further, the detector 44 transmits the detection result to the processor 50. For example, the detector 44 may include a plurality of light receiving elements and be configured to transmit to the processor 50 the detection results in the plurality of light receiving elements.

The processor 50 integrally controls each unit of the inclination measuring device 1. For example, the processor 50 can control turning-on and turning-off of the light source 10, and based on the reflected light rays via the plurality of cores in the light guide 20, the processor 50 can calculate the inclination angle of the measurement object 2. More specifically, the processor 50 can calculate the inclination angle of the measurement surface against the optical axis of each of the irradiated light rays, with which the respective plurality of spots have been irradiated, based on the reflected light rays from the plurality of spots on the measurement surface with respect to the plurality of irradiated light rays. Further, the processor 50 can notify the user of information by using the display 60. A description will later be given of a method for calculating the inclination angle of the measurement surface based on the reflected light rays from the plurality of spots.

The display 60 can notify the user of information in accordance with control by the processor 50. For example, the display 60 may be made up of a display segment 62 and an inclination indicator lamp 64.

The display segment 62 can display as a numeral value the inclination angle of the measurement object 2 calculated in the processor 50. The display segment 62 may be configured in any form so long as being able to notify the user of information. For example, the display segment 62 may be configured to display a measurement result by using a graph or a diagram.

The inclination indicator lamp 64 can be turned on in accordance with the inclination angle of the measurement object 2, calculated in the processor 50. For example, the inclination indicator lamp 64 may be configured to be turned on when the inclination angle of the measurement object 2 is not smaller than a predetermined threshold, so as to notify the user that the inclination angle is not smaller than the predetermined threshold. The inclination indicator lamp 64 may be configured in any form so long as being turned on in accordance with the inclination angle of the measurement object 2. For example, the inclination indicator lamp 64 may be configured to be turned on in different colors in accordance with the magnitude of the inclination angle of the measurement object 2. Alternatively, the inclination indicator lamp 64 may be configured to be turned on based on information other than the inclination angle of the measurement object 2. For example, the inclination indicator lamp 64 may be configured to notify the user by turning-on that an influence of an error is relatively large when the inclination angle of the measurement object 2 is equal to the predetermined threshold and the intensity of the reflected light ray from the spot, detected in the detector 44, is smaller than a predetermined lower limit.

(About Method for Calculating Inclination Angle)

Figure 3:
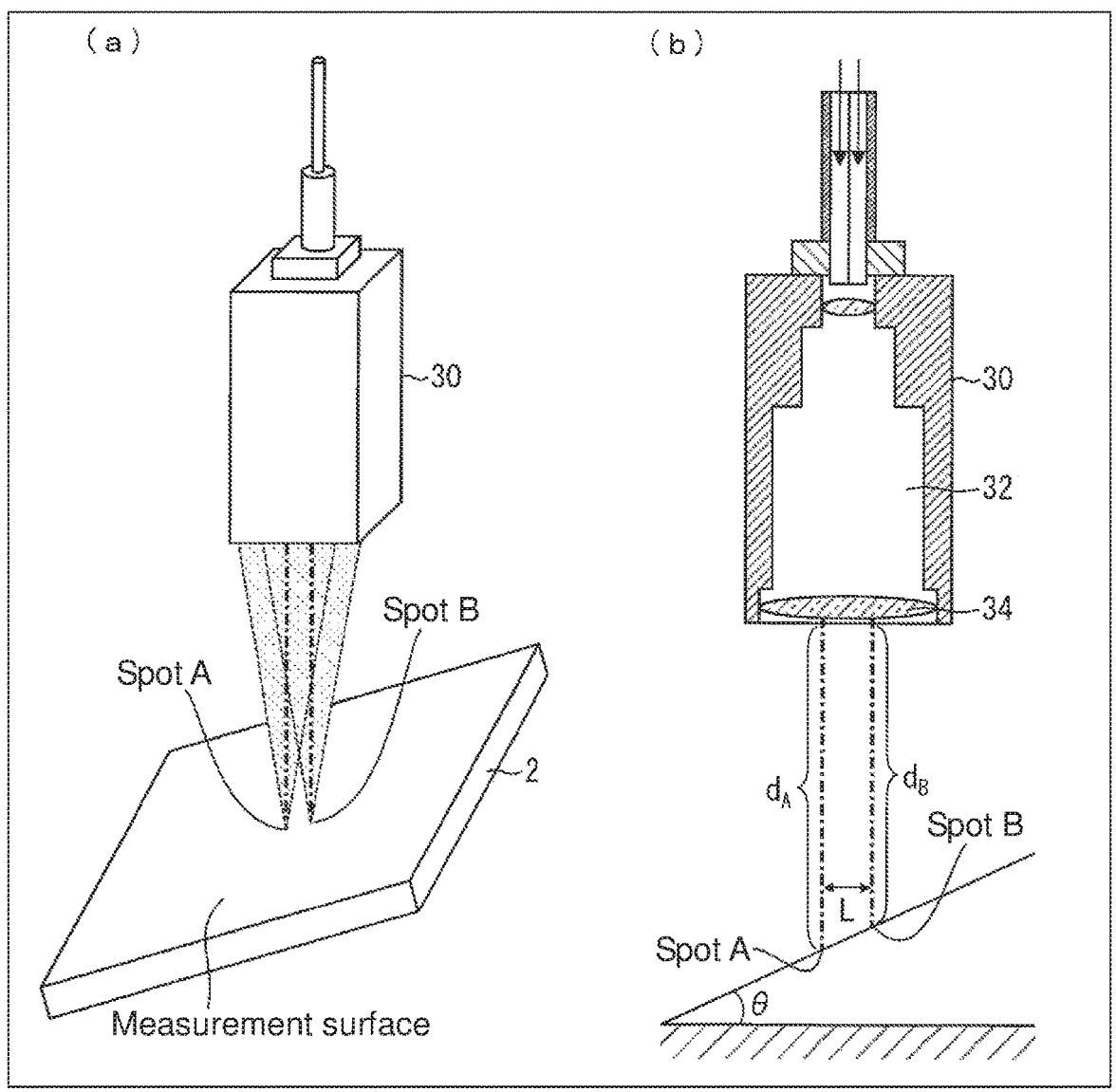
FIG. 3 shows a schematic view and a perspective view illustrating an example of calculating an inclination angle of a measurement surface by using the inclination measuring device according to the first embodiment of the present invention.

Hereinafter, with reference to (a) and (b) of FIG. 3, a description will be given of a method for calculating an inclination angle θ of the measurement surface based on reflected light rays from the plurality of spots, the method being performed in the processor 50. (a) of FIG. 3 is a schematic view illustrating an example of calculating the inclination angle θ of the measurement surface by using the inclination measuring device 1 according to the first embodiment, and (b) of FIG. 3 is a perspective view of (a) of FIG. 3 seen from the side. In the illustrative example, it is assumed that the surface between a spot A and a spot B is a smooth inclined surface without roughness so as to simplify description, and that an inclining direction of the measurement surface is the same as a direction in which the spot A and the spot B are located side by side.

First, as illustrated in (a) of FIG. 3, a state is considered where two irradiated light rays are provided from the sensor head 30 to the measurement object 2, and focused on two spots (spot A, spot B) on the measurement surface. That is, a case is considered where the spot A and the spot B are irradiated with two irradiated light rays via two cores among the plurality of cores provided in the light guide 20. At this time, the inclining direction of the measurement object 2 may be independent of the relative positions of the spot A and the spot B.

Next, the method for calculating the inclination angle θ of the measurement surface will be described with reference to (b) of FIG. 3.

Assuming that a distance between the spot A and the light receiving surface of the sensor head 30, namely a distance between the spot A and the objective lens 34 is $d_A$, and a distance between the spot B and the objective lens 34 is a distance $d_B$. Since the focal position of the irradiated light ray is made different on the optical axis for each wavelength by the chromatic aberration unit 32, $d_A$ and $d_B$ are known values corresponding to light rays having specific wavelengths at the spot A and the spot B, respectively.

When a distance L between the spot A and the spot B is used at this time, the inclination angle θ of the measurement surface of the measurement object 2 can be calculated by using the following formula.

[Formula 1]

$$\theta = \arctan\left(\frac{d_A - d_B}{L}\right) \quad (1)$$

N/A The distance L here is a known value because it is the same as the relative distance between the two cores which are provided in the light guide 20 and via which the two irradiated light rays have passed. That is, the inclination angle θ of the measurement surface can be calculated based on a distance $d_i$ between each of the plurality of spots and the light receiving surface of the sensor head 30 with respect to the reflected light rays from the plurality of spots and a relative distance L between the plurality of cores provided in the light guide 20 as to the plurality of irradiated light rays with respect to the plurality of spots.

In the illustrative example, the description has been given of the case where the inclining direction of the measurement surface is the same as the direction in which the spot A and the spot B are located side by side. However, in practice, there is considered a case where the inclining direction of the measurement surface is different from the direction in which the spot A and the spot B are located side by side. In such a case, the inclining direction of the measurement surface can be calculated by setting three or more spots on the measurement surface and calculating inclination angles between the respective spots. Alternatively, the inclining direction of the measurement surface may be calculated by, for example, rotating either the measurement object 2 or the sensor head 30 by 90° around the spot A as an axis and calculating the inclination angle between the spot A and the spot B at positions after the rotation.

(About Setting Three or More Spots)

Figure 4:
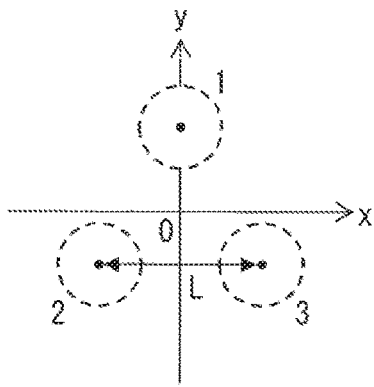
FIG. 4 shows schematic views illustrating the number and positions of spots made by irradiated light rays at a plurality of positions on the measurement surface in the inclination measuring device according to the first embodiment of the present invention.
Figure 4:
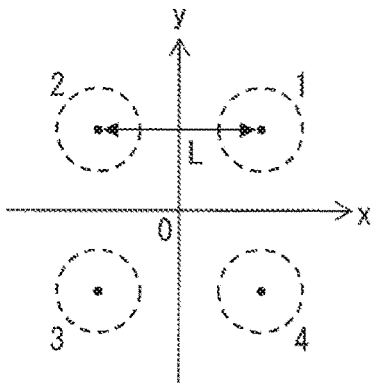
Figure 4:
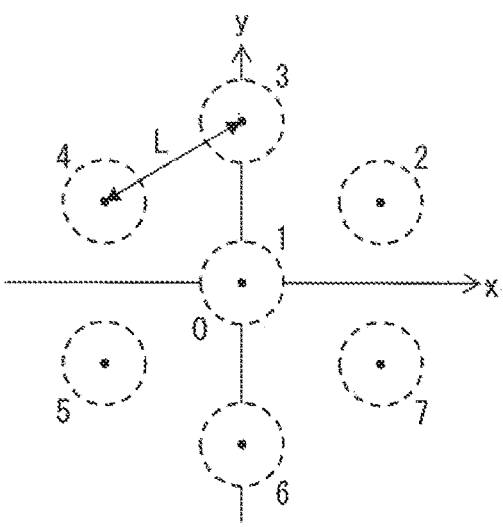

With reference to (a) to (c) of FIG. 4, a description will be given of a relative distance between spots when three or more spots are set on the measurement surface by irradiated light rays applied via the plurality of cores provided in the light guide 20. (a) to (c) of FIG. 4 are schematic views illustrating the number and positions of spots made by irradiated light rays at a plurality of positions on the measurement surface in the inclination measuring device 1 according to the first embodiment. The figures illustrate the cases of setting three, four, and seven spots.

(a) of FIG. 4 will be described below. In the illustrative example, three spots 1 to 3 are set on the xy-plane. The spots 1 to 3 are set so as to constitute vertexes of a regular triangle. An origin o of the xy-plane is set so as to be superimposed on the center of the regular triangle. Further, a distance L between the spots is a known value corresponding to a distance among three cores provided in the light guide 20, via which the respective spots are irradiated with irradiated light rays. A table on the right summarizes coordinates at the respective spots 1 to 3 on the xy-plane. For example, the coordinates of the spot 1 are as shown below.

[Formula 2]

$$(x_i, y_i) = \left(0, \frac{L}{\sqrt{3}}\right) \quad (2)$$

N/A In such a manner, based on the values of the respective coordinates at the spots 1 to 3, it is possible to calculate inclination angles of the measurement surface, an inclination angle $SLOPE_x$ in the x-axis direction and an inclination angle $SLOPE_y$ in the y-axis direction. That is, the inclination angles can be calculated using the following formulas:

[Formula 3]

$$SLOPE_x = \arctan\left(\frac{1}{N}\sum_{i=1}^{N}\left(\frac{d_i - \bar{d}}{x_i - \bar{x}}\right)\right) \quad (3)$$

[Formula 4]

$$SLOPE_y = \arctan\left(\frac{1}{N}\sum_{i=1}^{N}\left(\frac{d_i - \bar{d}}{y_i - \bar{y}}\right)\right) \quad (4)$$

[Formula 5]

$$\bar{d} = \frac{1}{N}\sum_{i=1}^{N}d_i, \bar{x} = \frac{1}{N}\sum_{i=1}^{N}x_i, \bar{y} = \frac{1}{N}\sum_{i=1}^{N}y_i \quad (5)$$

N/A where N is the number of spots, and N=3.

(b) of FIG. 4 illustrates a case where four spots 1 to 4 are set on the xy-plane. The spots 1 to 4 are set so as to constitute vertexes of a square. The origin o of the xy-plane is set so as to be superimposed on the center of the square. Also at this time, by applying the respective coordinate values at the spots 1 to 4 to Formulas (3) to (5), it is possible to calculate the inclination angle $SLOPE_x$ in the x-axis direction and the inclination angle $SLOPE_y$ in the y-axis direction.

(c) of FIG. 4 illustrates a case where seven spots 1 to 7 are set on the xy-plane. The spots 1 to 7 are set so as to constitute vertexes and the center of a regular hexagon. The origin o of the xy-plane is set so as to be superimposed on the spot 1 located at the center of the regular hexagon. Also at this time, by applying the respective coordinate values at the spots 1 to 7 to Formulas (3) to (5), it is possible to calculate the inclination angle $SLOPE_x$ in the x-axis direction and the inclination angle $SLOPE_y$ in the y-axis direction.

By the above method, the inclination angle of the measurement surface can be calculated with respect to each of the x-axis direction and the y-axis direction based on the relative positions of the three or more spots. While the number of spots may be three at the minimum, the larger the number, the more detailed profile about the measurement surface can be acquired at once. The inclination angle may also be calculated using only some spots out of the plurality of spots.

(About Setting of Region the Inclination Angle of which is to be Defined)

Figure 5:
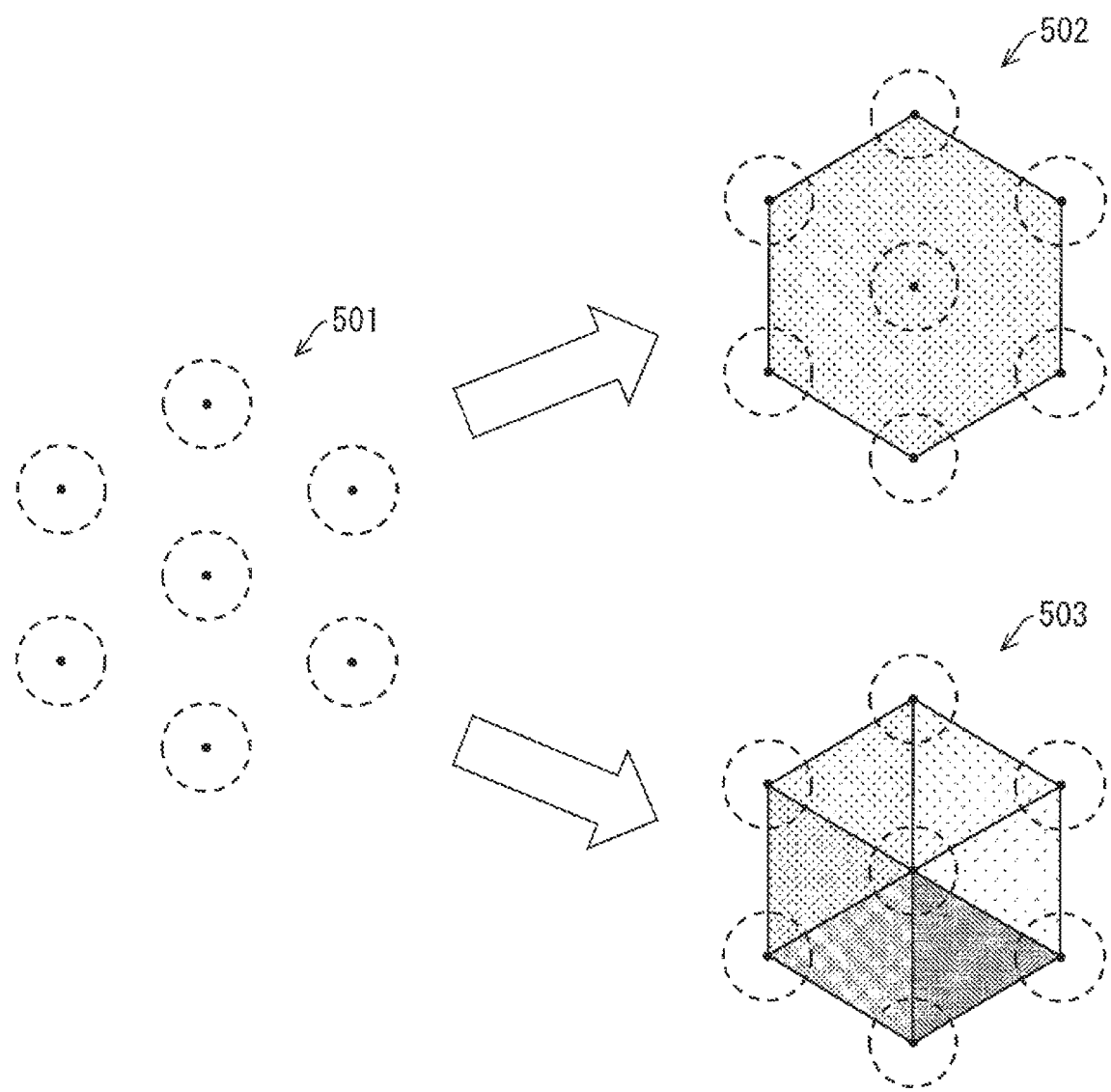
FIG. 5 is a schematic view illustrating combinations relating to selection of a region an inclination angle of which is to be defined from a plurality of spots in the inclination measuring device according to the first embodiment of the present invention.

With reference to FIG. 5, a more detailed description will be given of the method for calculating the inclination angle by using coordinates, described with reference to each view of FIG. 4. FIG. 5 is a schematic view illustrating combinations relating to selection of a region an inclination angle of which is to be defined from a plurality of spots in the inclination measuring device 1 according to the first embodiment.

As described with reference to FIG. 4, the inclination angle $SLOPE_x$ in the x-axis direction and the inclination angle $SLOPE_y$ in the y-axis direction can be calculated when there are at least three spots.

First, it is assumed that seven spots are set on the measurement surface as in 501. The seven spots respectively correspond to the spots 1 to 7 in (c) of FIG. 4. At this time, there are a plurality of combinations of coordinate values of the spots 1 to 7, to which Formulas (3) to (5) are applied.

502 illustrates a case where the coordinate values of each of the spots 1 to 7 are applied at once to each of Formula (3) to (5) At this time, an inclination angle of a region including the spot 1 and surrounded by the spots 2 to 7 is calculated as a uniform value.

503 illustrates a case where the region including the spot 1 and surrounded by the spots 2 to 7 is divided to be a combination of six triangles. Formulas (3) to (5) are applied to each of the divided six triangles, to calculate an inclination angle for each triangle. Thus, for example, when inclination of the measurement surface in a region surrounded by the spots 1 to 3 is different from inclination of the measurement surface in a region surrounded by the spots 1, 3 and 4, different inclination angles can be calculated for the respective regions.

Accordingly, by appropriately selecting a region an inclination angle of which is to be defined from a plurality of spots, it is possible to appropriately calculate the inclination angle. For example, only when a detailed profile needs to be acquired, the region the inclination angles of which are to be defined may be set finely, and when a detailed profile does not need to be acquired, the region may be set widely to reduce the inclination angle calculating frequency, thereby improving the processing speed.

(Example of Calculating Inclination Angle)

Figure 6:
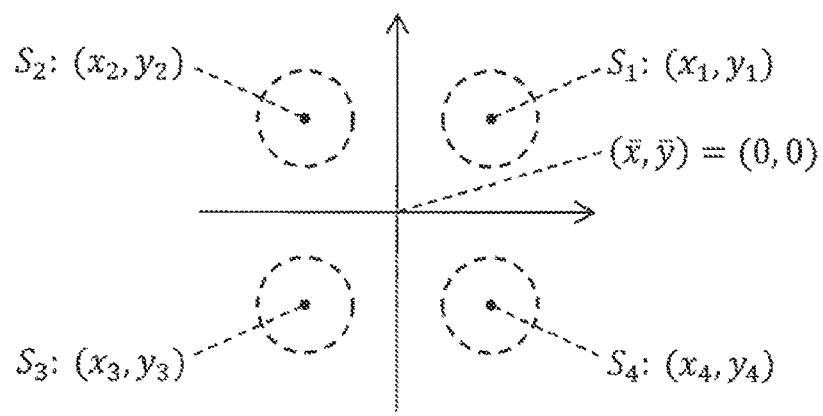
FIG. 6 is a schematic diagram illustrating a concrete example of calculating an inclination angle from measurement results when four spots are made in the inclination measuring device according to the first embodiment of the present invention.

An example of calculating the inclination angle of the measurement surface will be illustrated with reference to FIG. 6. FIG. 6 is a schematic diagram illustrating a concrete example of calculating an inclination angle from measurement results when four spots are made in the inclination measuring device 1 according to the first embodiment. As in (b) of FIG. 4, it is assumed that four spots $S_1$ to $S_4$ are disposed so as to constitute vertexes of a square which are disposed with its center superimposed on the origin o of the xy-plane.

In the chart, "Spot-to-spot distance (μm)" represents a distance L between each of spots $S_1$ to $S_4$, "Measured distance (μm) to $S_n$" represents distances $d_1$ to $d_4$ from the respective spots $S_1$ to $S_4$ to the light receiving surface of the sensor head 30. "x-inclination angle (degrees)" represents an inclination angle of the measurement surface in the x-axis direction, and "y-inclination angle (degrees)" represents an inclination angle of the measurement surface in the y-axis direction.

As an example, data on a first row in the chart will be described. When the data on the first row is applied to Formula (5), the following is given.

[Formula 6]

$$\bar{d}=10000, \bar{x}=0, \bar{y}=0 \qquad (6)$$

N/A When Formula (6) is applied to Formulas (3) and (4), it is possible to calculate: $SLOPE_x=0$ (degrees) and $SLOPE_y=9.78$ (degrees).

(Configuration Example of Inclination Measuring Device)

A specific configuration example of the inclination measuring device 1 according to the first embodiment will be described with reference to FIGS. 7 to 10. FIGS. 7 to 10 are schematic views each illustrating an example of the device configuration of the inclination measuring device 1 according to the first embodiment.

Figure 7:
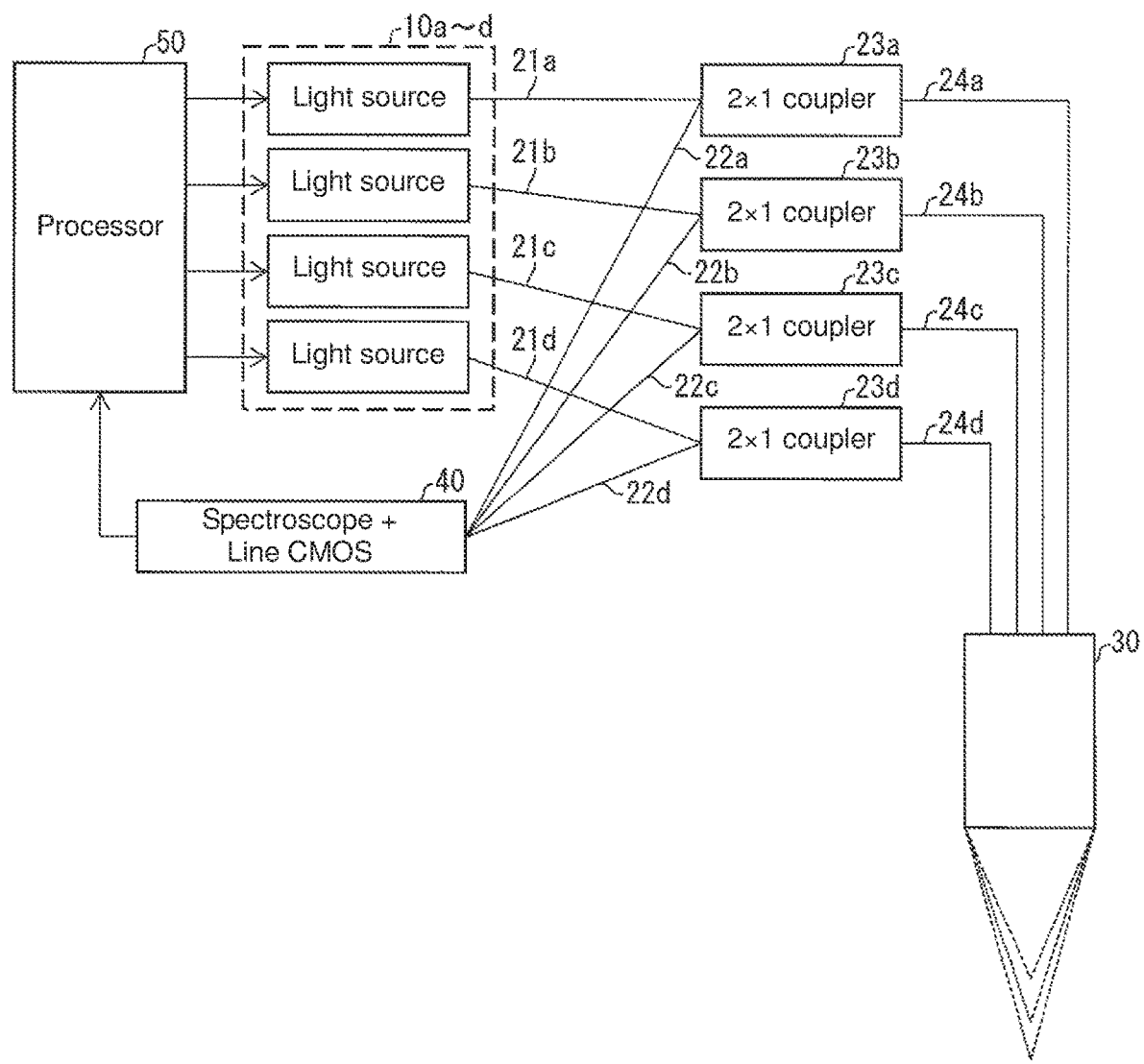
FIG. 7 is a schematic diagram illustrating an example of the device configuration of the inclination measuring device according to the first embodiment of the present invention.

A difference of the configuration example in FIG. 7 from that of FIG. 1 will be described below. In FIG. 7, the light source 10 is made up of four light sources 10a to 10d, which sequentially emit irradiated light rays through control by the processor 50. The light sources 10a to 10d are optically connected to input-side cables 21a to 21d, respectively. The input-side cables 21a to 21d will be described later. That is, the irradiated light rays sequentially emitted from the light sources 10a to 10d enter the input-side cables 21a to 21d.

In FIG. 7, the light guide 20 has a plurality of propagation structures made up of an input-side cable 21, an output-side cable 22, a 2×1 coupler 23, and a head-side cable 24. In the illustrative example, the light guide 20 is provided with four propagation structures. The light guide 20 propagates irradiated light rays, having entered the input-side cables 21a to 21d from the respective light sources 10a to 10d, inside 2×1 couplers 23a to 23d and head-side cables 24a to 24d, and irradiates the spots on the measurement surface with the irradiated light rays from the sensor head 30. Further, the light guide 20 propagates reflected light rays from the spots inside the head-side cables 24a to 24d, the 2×1 couplers 23a to 23d, and output-side cables 22a to 22d, and outputs the reflected light rays to the light receiving unit 40.

The input-side cable 21 is a cable, both ends of which are optically connected to the light source 10 and the 2×1 coupler 23, respectively, and which propagates the irradiated light rays. In the illustrative example, the input-side cables 21a to 21d are optically connected to the light sources 10a to 10d and the 2×1 couplers 23a to 23d, respectively.

The output-side cable 22 is a cable, both ends of which are optically connected to the 2×1 coupler 23 and the light receiving unit 40, respectively, and which propagates the reflected light rays. In the illustrative example, the output-side cables 22a to 22d are optically connected to the 2×1 couplers 23a to 23d and the light receiving unit 40, respectively.

The 2×1 coupler 23 is a coupler optically connected to the input-side cable 21, the output-side cable 22, and the head-side cable 24, and having a multiplexing/demultiplexing structure. In the illustrative example, the 2×1 coupler 23 is a 2×1 star coupler (two inputs and one output/one input and two outputs) corresponding to a Y-branch coupler. In the illustrative example, the 2×1 couplers 23a to 23d propagate the irradiated light rays, having entered from the input-side cables 21a to 21d, to the head-side cables 24a to 24d and also propagates the reflected light rays, having entered from the head-side cables 24a to 24d, to the output-side cables 22a to 22d.

The head-side cable 24 propagates the light rays having entered from the 2×1 coupler 23 and irradiates the spots on the measurement surface with the light rays via the sensor head 30. The head-side cable 24 also propagates reflected light rays when the reflected light rays enter thereinto, and outputs the reflected light rays to the 2×1 coupler 23. In the illustrative example, the head-side cables 24a to 24d propagate the irradiated light rays having entered from the 2×1 couplers 23a to 23d, and also propagate the reflected light rays to the 2×1 couplers 23a to 23d.

Note that each of the input-side cable 21, the output-side cable 22, and the head-side cable 24 may be any kind so long as having a configuration being able to propagate light rays. In the illustrative example, each of the input-side cables 21a to 21d, the output-side cables 22a to 22d, and the head-side cables 24a to 24d is an optical fiber having a single core at the center. That is, the core may be optically connected one-to-one with each of the plurality of light sources 10a to 10d.

A basic configuration of the light receiving unit 40 is similar to that in FIG. 1, but the detector 44 is made up of a line CMOS. The line CMOS is a line sensor (one-dimensional sensor) having a plurality of light receiving elements that are one-dimensionally disposed and correspond to directions of the light rays separated by the spectroscope 42. That is, a reflected light ray having entered the spectroscope 42 from each of the output-side cables 22a to 22d is separated into wavelength components, and outputs peaks in different positions on the line CMOS.

In the example of FIG. 7, with the light sources 10a to 10d configured to emit light rays sequentially, the irradiated light ray propagated through each of the input-side cables 21a to 21d, the 2×1 couplers 23a to 23d, and the head-side cables 24a to 24d is focused only on a specific spot corresponding to the light source that is emitting a light ray. It is then possible to detect only the reflected light rays from the specific spots. Accordingly, as compared with the case of causing the light sources 10a to 10d to simultaneously emit light rays, it is possible to prevent an influence of an error in a measurement result due to interference between reflected light rays.

Figure 8:
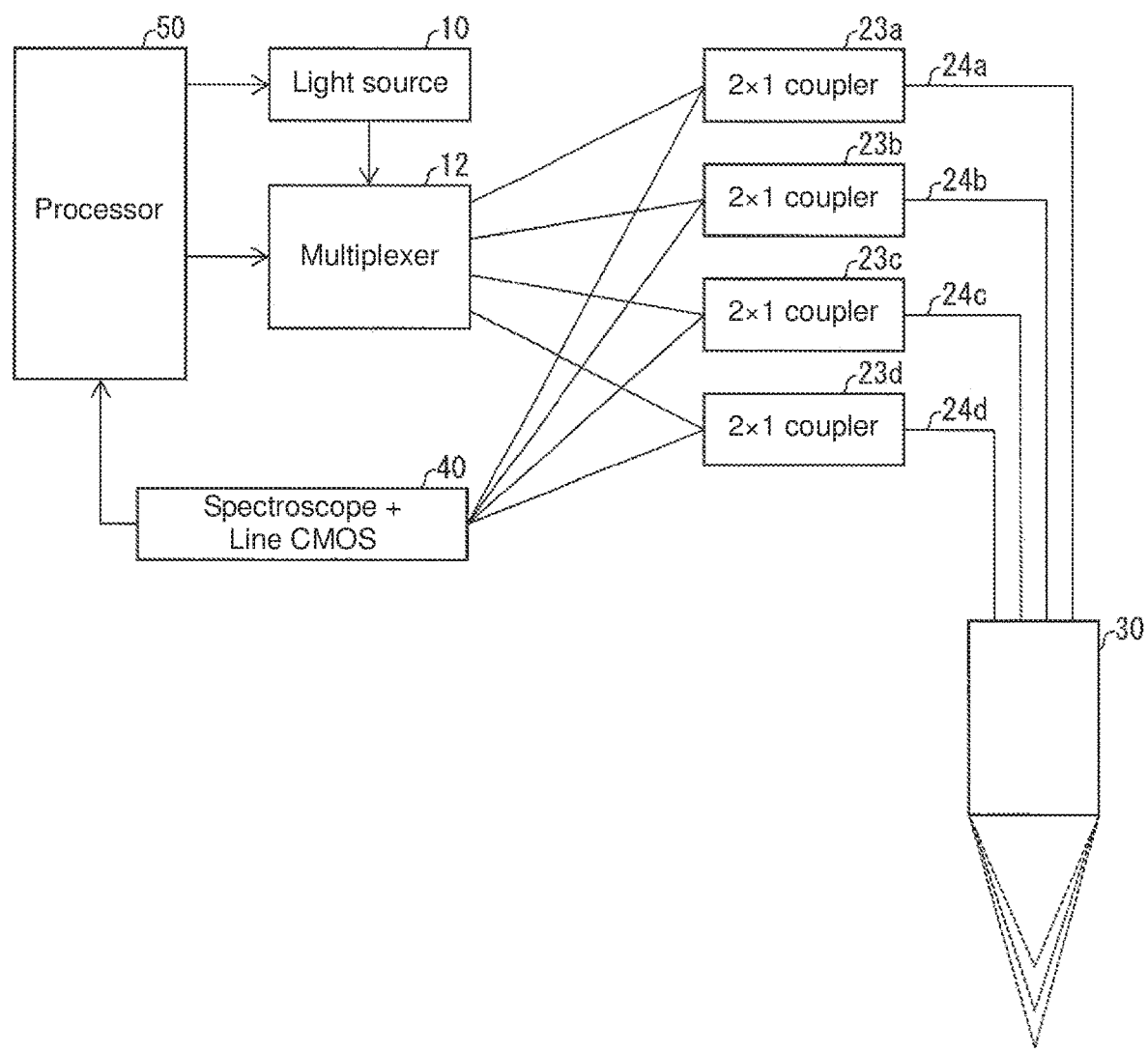
FIG. 8 is a schematic diagram illustrating an example of the device configuration of the inclination measuring device according to the first embodiment of the present invention.

A description will be given of a difference of the configuration example of FIG. 8 from that of FIG. 7. In FIG. 8, a basic configuration is the same as that in FIG. 7, but only one light source 10 is provided, and a multiplexer 12 is further provided. Moreover, the configuration example of FIG. 8 is different in that the input-side cables 21a to 21d are optically connected with the multiplexer 12 instead of the light source 10.

The multiplexer 12 has a function as a selection unit capable of selectively providing the irradiated light ray from the light source 10 to any of the input-side cables 21a to 21d optically connected with the multiplexer 12 in accordance with control by the processor 50. Note that any optical device may be used as the multiplexer 12 so long as being able to select a core to be provided with an irradiated light ray.

In the example of FIG. 8, with the multiplexer 12 being able to selectively provide the irradiated light ray to any of the input-side cables 21a to 21d, it is possible to prevent an influence of an error in a measurement result due to interference between reflected light rays, similarly to the configuration example of FIG. 7.

Figure 9:
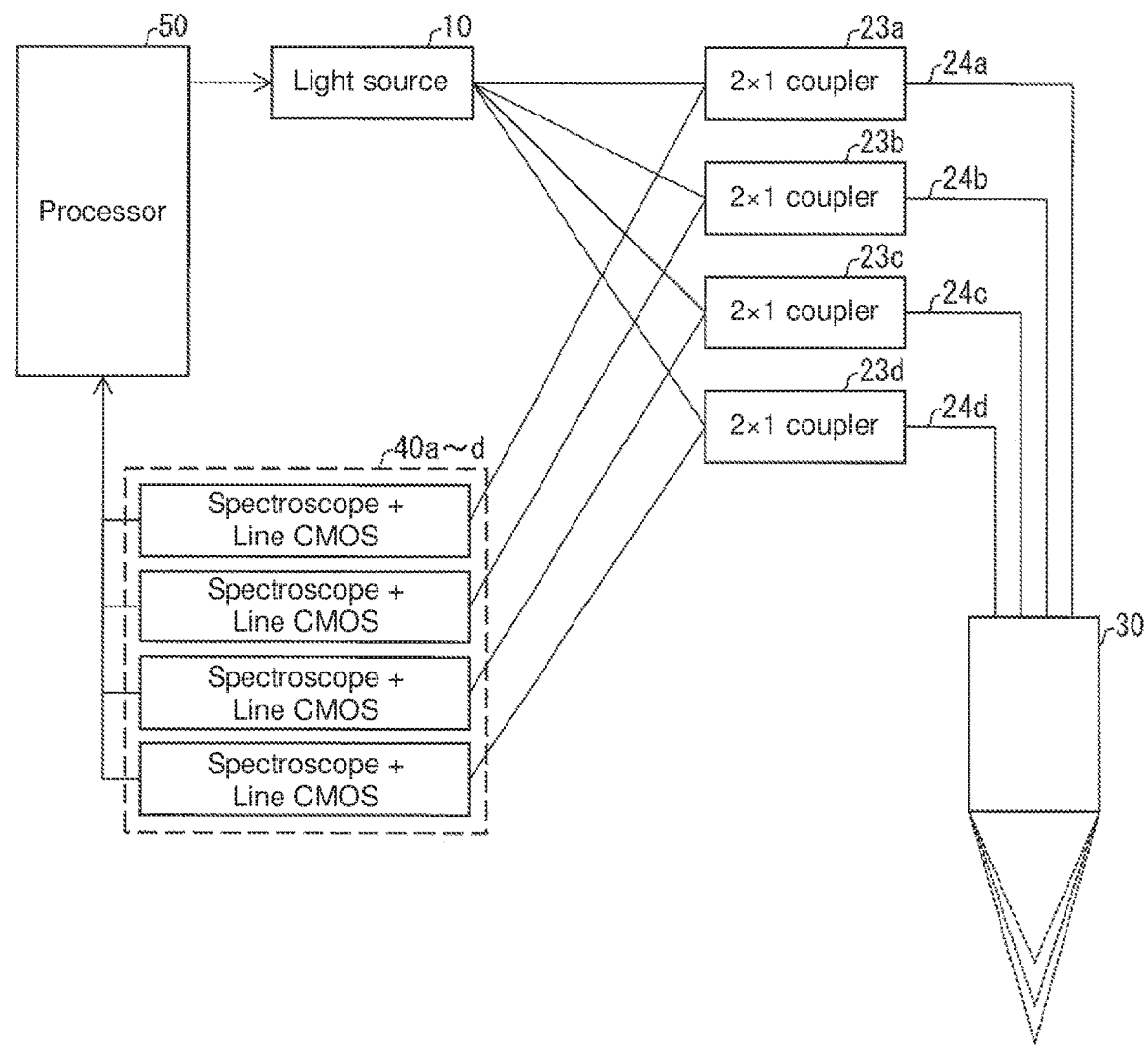
FIG. 9 is a schematic view illustrating an example of the device configuration of the inclination measuring device according to the first embodiment of the present invention.

A description will be given of a difference of the configuration example of FIG. 9 from that of FIG. 8. FIG. 9 is the same as FIG. 8 in the basic configuration, but is different in the absence of the multiplexer 12 and placement of a plurality of light receiving units 40a to 40d.

The light source 10 emits light all the time, and emits irradiated light rays into the respective input-side cables 21a to 21d.

The light receiving units 40a to 40d are the same in the basic configuration as the light receiving unit 40 in FIG. 8, but are different in that one light receiving unit is optically connected with only one output-side cable 22. That is, the respective light receiving units 40a to 40d are connected one-to-one with the respective plurality of cores provided in the output-side cables 22a to 22d. Note that the respective plurality of light receiving units 40a to 40d are provided with spectroscopes 42a to 42d and detectors 44a to 44d. Hence the inclination measuring device 1 can calculate distances between the respective plurality of spots and the sensor head 30 with respect to the reflected light rays based on detected values in the respective plurality of detectors 44a to 44d provided in the respective plurality of light receiving units 40a to 40d.

In the example of FIG. 9, since the irradiated light rays simultaneously enter the four input-side cables 21a to 21d from one light source 10, the four spots on the measurement surface are simultaneously irradiated with the light rays. The reflected light rays from the respective spots are propagated through the output-side cables 22a to 22d and received in the respective light receiving units 40a to 40d. Thereby, the reflected light rays having entered the respective head-side cables 24a to 24d do not interfere with each other at the time of detection in the detectors 44a to 44d. Accordingly, similarly to the configuration examples of FIGS. 7 and 8, it is possible to prevent an influence of an error in a measurement result due to interference between reflected light rays.

Figure 10:
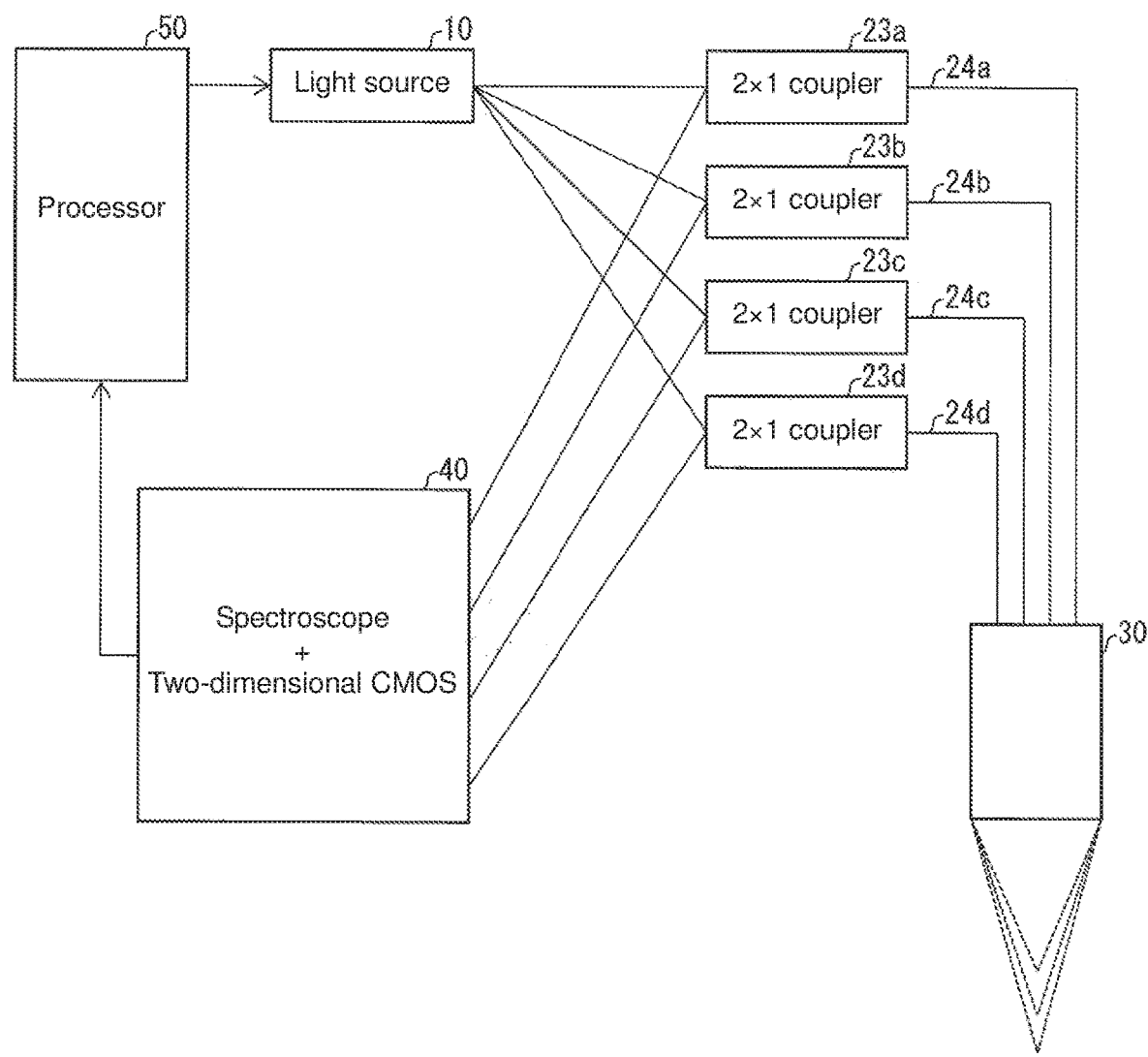
FIG. 10 is a schematic view illustrating an example of the device configuration of the inclination measuring device according to the first embodiment of the present invention.

A description will be given of a difference of the configuration example of FIG. 10 from that of FIG. 9. FIG. 10 is the same as FIG. 9 in the basic configuration, but is different in part of the configuration of the light receiving unit 40. In the configuration example of FIG. 10, the detector 44 provided in the light receiving unit 40 is configured as a two-dimensional CMOS. The two-dimensional CMOS here is different from the line CMOS set as the detector 44 in FIG. 9 in that a plurality of light receiving elements are two-dimensionally disposed on the detection surface. At this time, a distance $d_t$ between each of the plurality of spots and the light receiving surface of the sensor head can be calculated based on detected values with respect to the plurality of two-dimensionally disposed light receiving elements.

In the example of FIG. 10, four spots on the measurement surface are simultaneously irradiated with light rays from one light source 10 via the light guide 20 and the sensor head 30. The reflected light rays from the respective spots are propagated through the output-side cables 22a to 22d and received in the light receiving unit 40. The four reflected light rays corresponding to the four spots and received in the light receiving unit 40 are each separated into wavelength components by the spectroscope 42, and output peaks in different positions on the two-dimensional CMOS for each wavelength. At this time, the peaks of the respective reflected light rays appear at different positions on the detection surface based on the relative positions of the output-side cables 22a to 22d, and it is thereby possible to prevent an influence of an error in a measurement result due to interference between reflected light rays, similarly to the configuration examples of FIGS. 7 to 9.

(Flow of Inclination Angle Calculation Processing)

Figure 11:
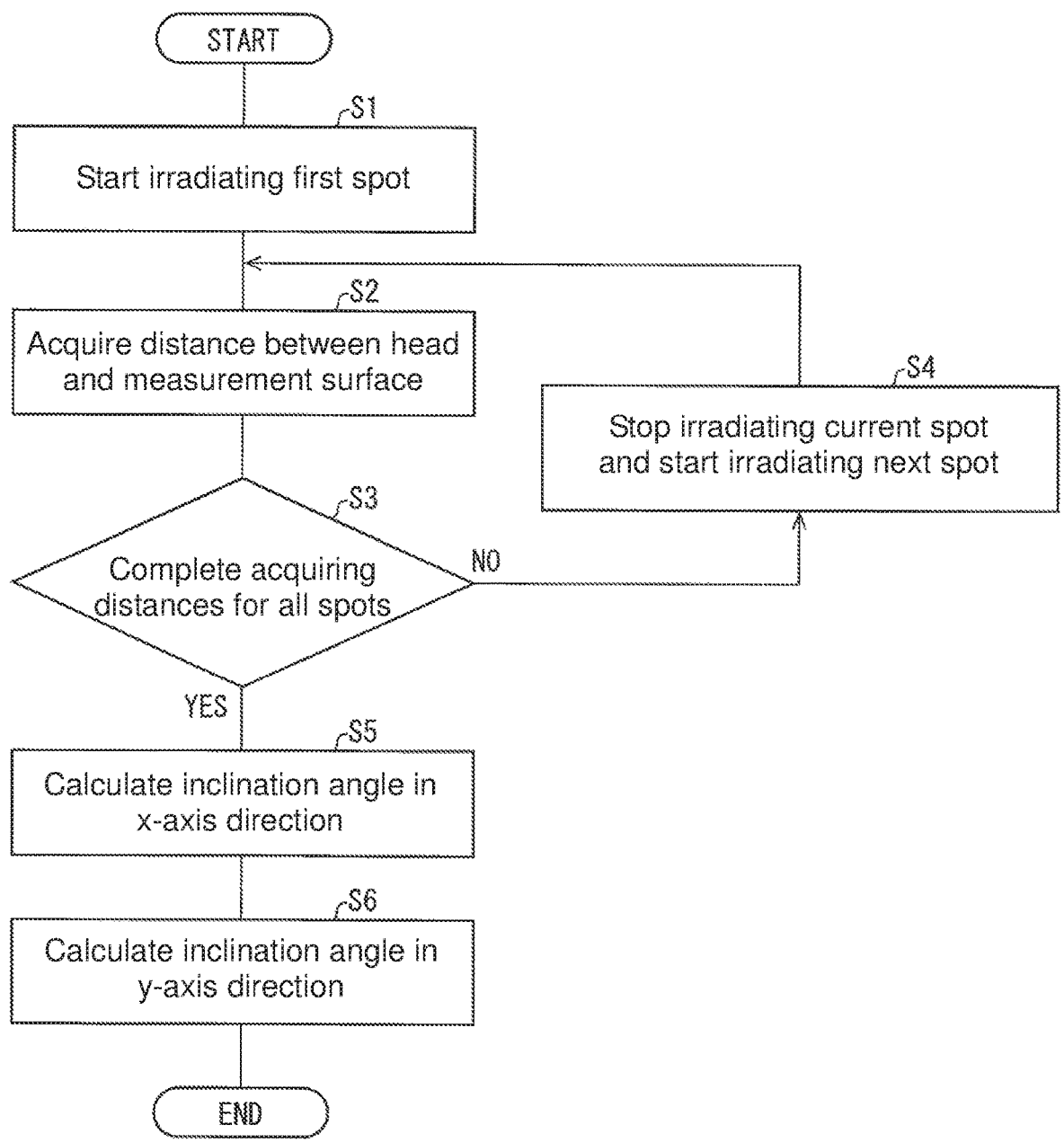
FIG. 11 is a flowchart illustrating an example of processing for calculating an inclination angle in the inclination measuring device according to the first embodiment of the present invention.

With reference to FIG. 11, a description will be given of processing for calculating the inclination angle of the measurement surface of the measurement object 2, executed by the inclination measuring device 1 according to the first embodiment. FIG. 11 is a flowchart illustrating an example of the processing for calculating the inclination angle in the inclination measuring device 1 according to the first embodiment. In the following description, it is assumed that the inclination measuring device 1 uses the configuration example of FIG. 7, and that the inclination angle is calculated using four spots on the measurement surface.

First, the processor 50 starts irradiating the first spot with an irradiated light ray (S1). Next, the processor 50 acquires a distance $d_i$ between the light receiving surface of the sensor head 30 and the first spot on the measurement surface from a detection result of peak with respect to each wavelength of a reflected light ray from the first spot, received in the light receiving unit 40 (S2).

After S2, the processor 50 determines whether or not acquisition of distances $d_1$ to $d_4$ for all the four spots has been completed (S3). When determining that the acquisition has not been completed (NO in S3), the processor 50 stops irradiating the spot currently being irradiated, and starts irradiating the next spot with a light ray (S4). For example, when currently irradiating the first spot with a light ray, the processor 50 starts irradiating the second spot. On the other hand, when determining that acquisition of the distances has been completed for all the spots (YES in S3), the processor 50 calculates an inclination angle in the x-axis direction (S5) and further calculates an inclination angle in the y-axis direction (S6), by using Formulas (3) to (5).

By repeating a series of processing of S2 to S4, the inclination measuring device 1 can calculate distances $d_1$ to $d_4$ with respect to all of the four spots, and further calculate the respective inclination angles in the x-axis direction and the y-axis direction of the measurement surface.

Note that the above description has been given based on the configuration example of FIG. 7, but this is not restrictive. For example, a similar flowchart can be executed also in the configuration examples of FIGS. 8 to 10.

(Flow of Processing for Determining Necessity to Turn on Inclination Indicator Lamp)

Figure 12:
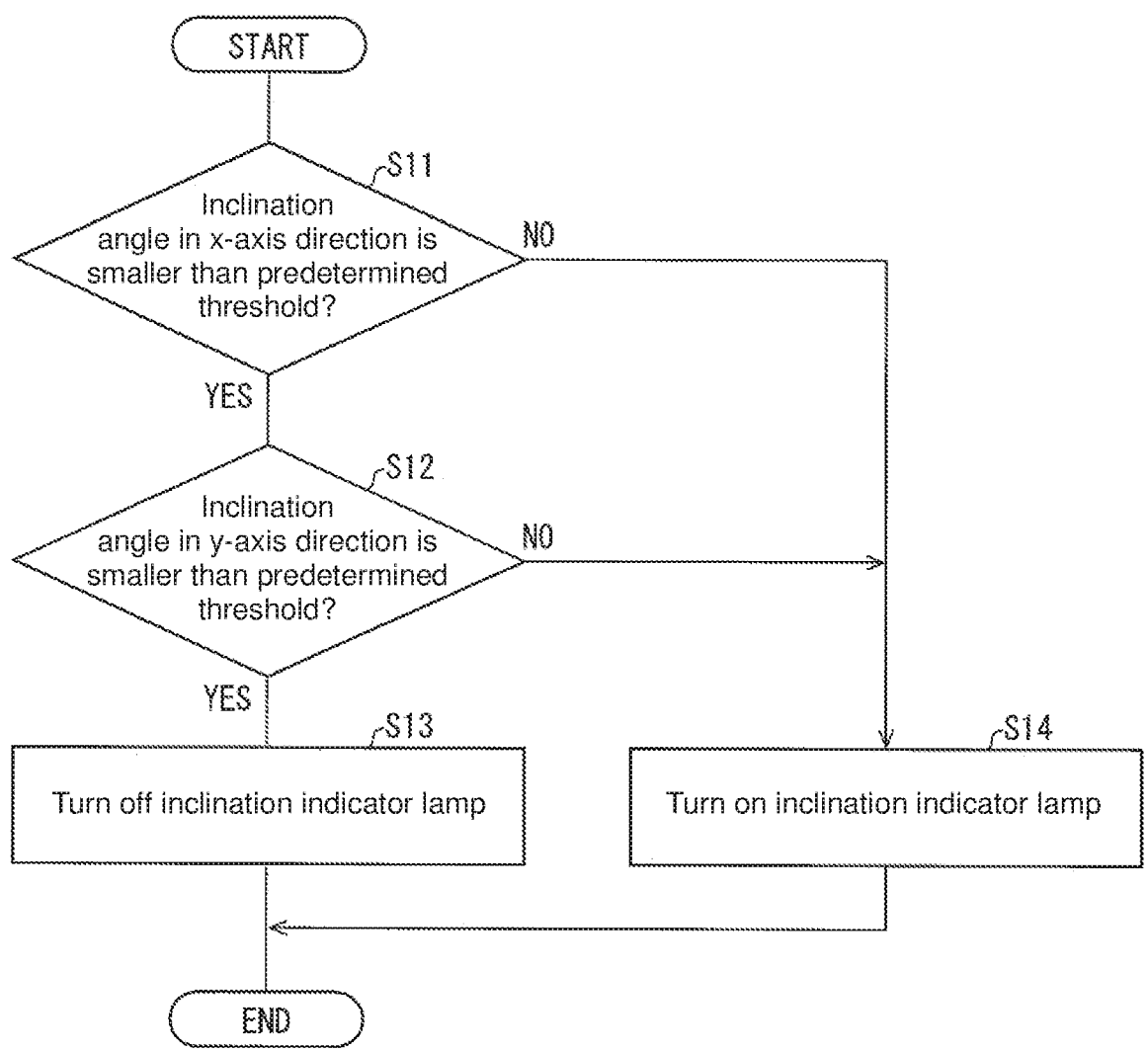
FIG. 12 is a flowchart illustrating an example of processing for deciding the necessity to turn on an inclination indicator lamp based on the inclination angle calculated in the inclination measuring device according to the first embodiment of the present invention.

With reference to FIG. 12, a description will be given of processing for determining the necessity to turn on the inclination indicator lamp 64 based on the calculated inclination angle, the processing being performed by the inclination measuring device 1 according to the first embodiment. FIG. 12 is a flowchart illustrating an example of the processing for deciding the necessity to turn on the inclination indicator lamp 64 based on the calculated inclination angle in the inclination measuring device 1 according to the first embodiment. The inclination angle here is assumed to have been calculated by the flowchart of FIG. 11.

First, the processor 50 determines whether or not the inclination angle in the x-axis direction calculated in S5 of FIG. 11 is smaller than a predetermined threshold (S11). When determining that the inclination angle is smaller than the predetermined threshold (YES in S11), the processor 50 determines whether or not the inclination angle in the y-axis direction, calculated in S6 of FIG. 11, is smaller than the predetermined threshold (S12). When determining that it is smaller than the predetermined threshold (YES in S12), the processor 50 turns off the inclination indicator lamp 64 (S13). On the other hand, when determining that it is not smaller than the predetermined threshold in S11 (NO in S11), or when determining that it is not smaller than the predetermined threshold in S12 (NO in S12), the processor 50 turns on the inclination indicator lamp 64 (S14). A series of processing is then completed.

From the above processing, when at least either the inclination angle in the x-axis direction or the inclination angle in the y-axis direction is not smaller than the predetermined threshold, the inclination measuring device 1 can notify the user about that by turning on the inclination indicator lamp 64.

With the above configuration, the inclination measuring device 1 according to the first embodiment can calculate the inclination angle of the measurement surface of the measurement object 2 against the optical axis of the irradiated light ray based on the reflected light rays from the plurality of spots on the measurement surface with respect to the plurality of irradiated light rays, with which the respective plurality of spots have been irradiated. It is thereby possible to perform appropriate measurement in view of the inclination of the measurement surface in measuring the measurement object 2 of the inclination measuring device 1. Accordingly, it is possible to produce the effect of being able to provide an inclination measuring device with excellent convenience concerning measurement of the measurement object.

Second Embodiment

Hereinafter, a second embodiment of the present invention will be described with reference to FIGS. 13 to 16.

(Configuration of Control System)

Figure 13:
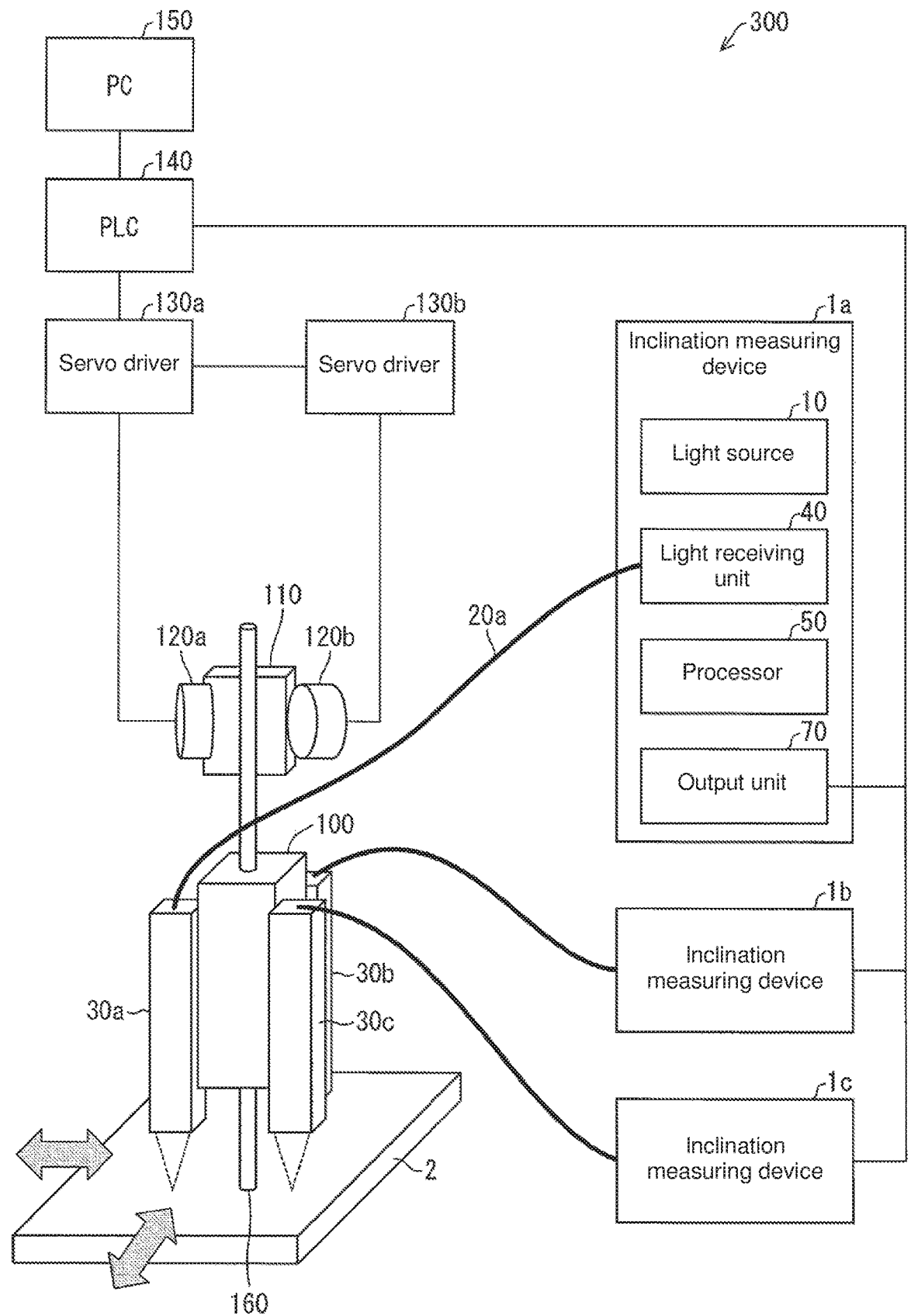
FIG. 13 is a schematic view illustrating an example of a device configuration of a control system according to a second embodiment of the present invention.

A configuration of a control system 300 according to the second embodiment will be described with reference to FIG. 13. FIG. 13 is a schematic view illustrating an example of a device configuration of the control system 300 according to the second embodiment.

The control system 300 can calculate an inclination angle on the measurement surface of a measurement object 2, to correct the inclination angle such that an action point of the control system 300 is always vertical to the measurement surface. In the illustrative example, the control system 300 is provided with inclination measuring devices 1a to 1c and a position control device 200. The position control device 200 is provided with a casing 100, an actuator 110, servo motors 120a and 120b, servo drivers 130a and 130b, a PLC 140, a PC 150, and an action point 160.

A basic configuration of each of the inclination measuring devices 1a to 1c is the same as that of the inclination measuring device 1 in the above first embodiment, but sensor heads 30a to 30c are fixed to the casing 100. Further, each of the inclination measuring devices 1a to 1c is different in that, after acquiring a distance $d_i$ from the light receiving surface of each of the sensor heads 30a to 30c to each spot on the measurement surface based on a peak of a wavelength of the reflected light ray in the light receiving unit 40, the processor 50 outputs the acquisition result to the PLC 140 via an output unit 70.

Based on the respective measurement results of the inclination measuring devices 1a to 1c, the position control device 200 can control the placement relation between each of the inclination measuring devices 1a to 1c, the casing 100, or the action point 160 and the measurement surface of the measurement object 2 so as to cancel the inclination angle of the measurement surface. In other words, the position control device 200 can control the position of the entire casing 100 including the action point 160 so as to make the action point 160 vertical to the measurement surface.

The casing 100 is fixed to the actuator 110, to fix the sensor heads 30a to 30c. In the illustrative example, the casing 100 has a vertically stretching rod-like shape, and includes the action point 160 at its end adjacent to the measurement surface. Further, the optical axis direction of each of the sensor heads 30a to 30c is preferably parallel to the longitudinal axis direction of the casing 100.

The action point 160 is a point that acts on the measurement surface. For example, the action point 160 is a drill or the like for cutting the measurement surface. The action point 160 may be integrally formed with the casing 100, or only the action point 160 may be configured to be replaceable in accordance with a purpose.

The actuator 110 can be operated by drive of the servo motors 120a and 120b to change the position of the action point 160.

The servo motors 120a and 120b can be driven in accordance with control by the servo drivers 130a and 130b, to operate the actuator 110. The servo motors 120a and 120b may be any motors so long as having a configuration being able to operate the actuator 110. For example, the servo motors 120a and 120b may be configured such that directions in which the actuator 110 is operated are orthogonal to each other.

The servo drivers 130a and 130b can transmit control commands to the servo motors 120a and 120b in accordance with control by the PLC 140.

The PLC 140 can control each of the inclination measuring devices 1a to 1c. The PLC 140 can calculate an inclination angle θ of the measurement surface based on the distance $d_i$ from the light receiving surface of each of the sensor heads 30a to 30c to each spot on the measurement surface received from the inclination measuring devices 1a to 1c and the relative distance between the inclination measuring devices 1a to 1c. Further, based on the calculated inclination angle θ, the PLC 140 can control operation of the entire casing 100 including the action point 160. For example, the PLC 140 may be a PLC (Programmable Logic Controller) provided with the above function.

The PC 150 is a computer provided with a user interface for operating the PLC 140. The user may use the PC 150 to be able to confirm the calculation result of the inclination angle of the measurement surface obtained by each of the inclination measuring devices 1a to 1c, or to be able to confirm corrected content of the inclination angle of the measurement surface performed by the actuator 110.

(About Correction of Inclination Angle)

Figure 14:
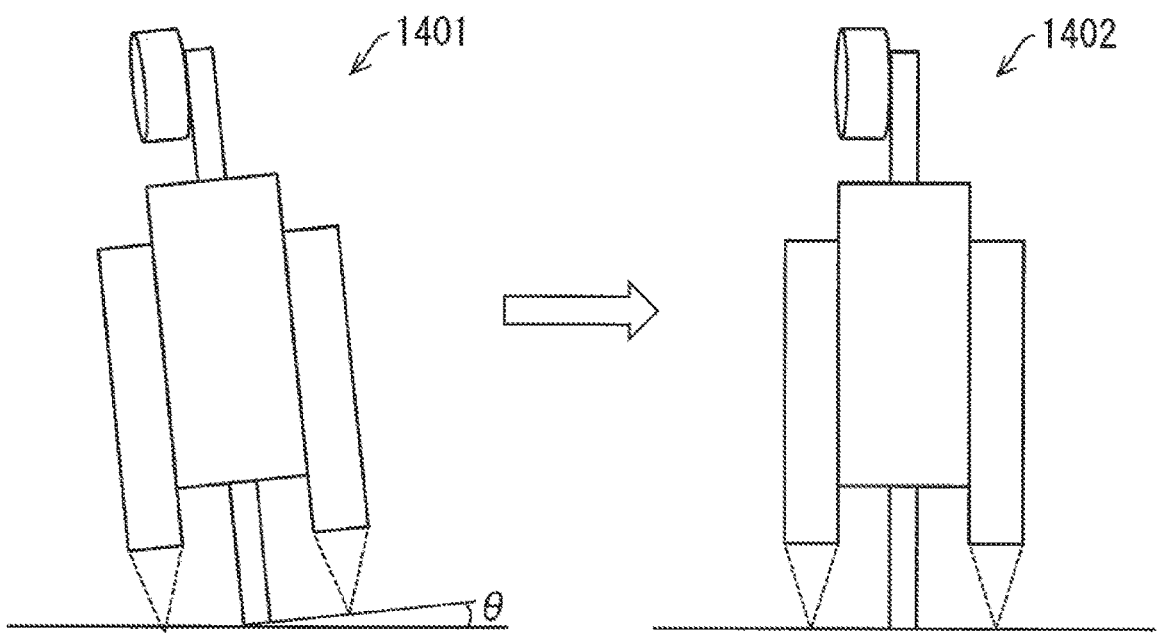
FIG. 14 is a schematic view illustrating an example of control to adjust an action point so as to be vertical to a measurement surface in the control system according to the second embodiment of the present invention.

With reference to FIG. 14, a description will be given of correction of the inclination angle of the measurement surface at the action point, executed by the control system 300 according to the second embodiment. FIG. 14 is a schematic view illustrating an example of control to adjust the action point 160 to be vertical to the measurement surface in the control system 300 according to the second embodiment.

In the illustrative example, numeral 1401 denotes a case where the measurement surface of the measurement object 2 has the inclination angle θ against the optical axis of each of the inclination measuring devices 1a to 1c and the longitudinal axis of the casing 100. At this time, the control system 300 can calculate the inclination angle θ based on the measurement result of each of the inclination measuring devices 1a to 1c.

Numeral 1402 denotes a state after correction of the inclination angle θ calculated in the state of 1401. That is, the control system 300 drives the entire casing 100 including the action point 160 so as to cancel the calculated inclination angle θ. How to drive the servo motors 120a and 120b with respect to the magnitude of the inclination angle θ so as to cancel the inclination angle θ may be previously set in the PLC 140 or may be set by the user by using the PC 150. Alternatively, it may be updated as appropriate in accordance with a result of diagnosing the state of the control system 300.

(Flow of Inclination Angle Calculation Processing)

Figure 15:
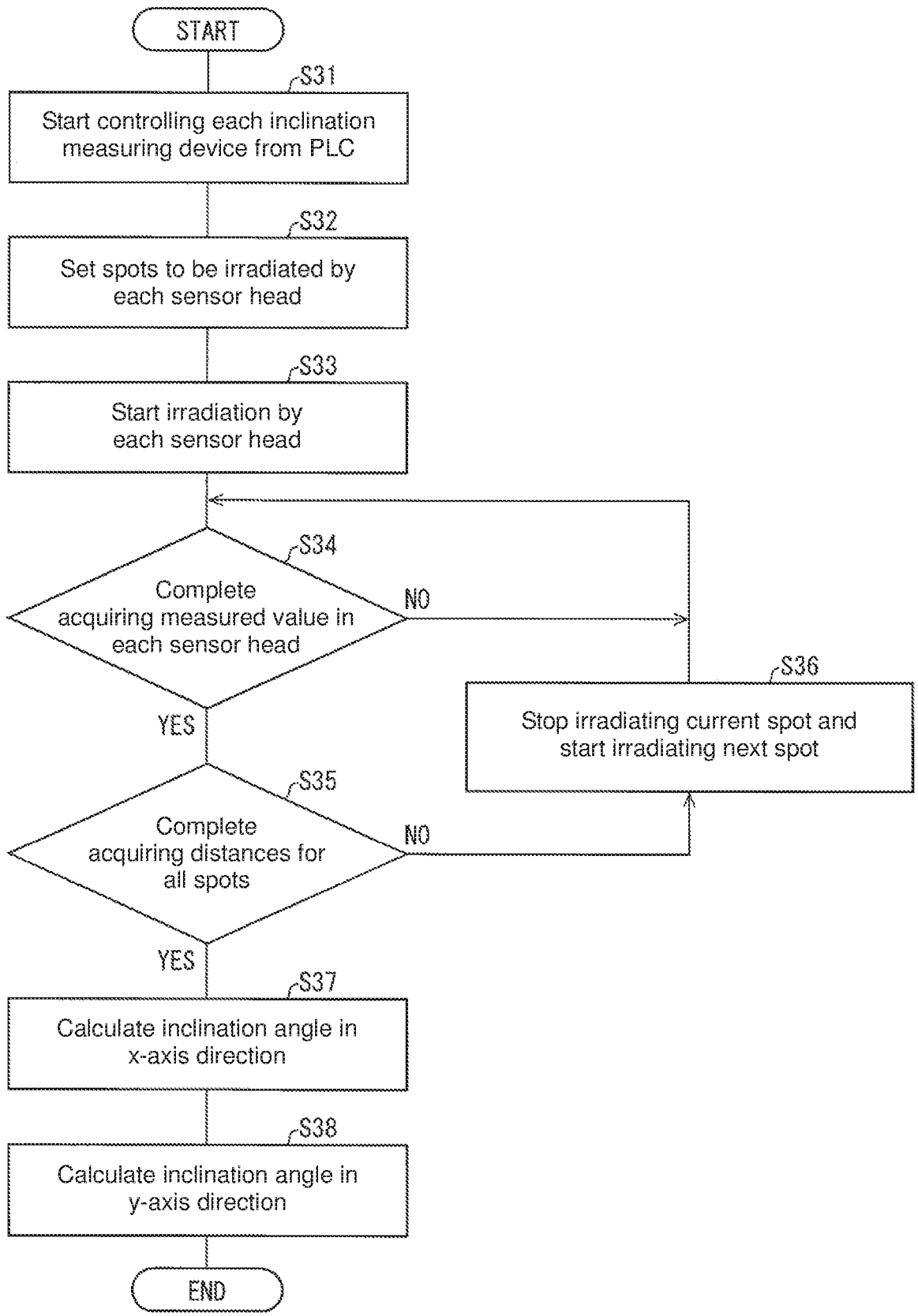
FIG. 15 is a flowchart illustrating an example of processing for calculating an inclination angle in the control system according to the second embodiment of the present invention.

The flow of the processing executed by the control system 300 according to the second embodiment will be described with reference to FIG. 15. FIG. 15 is a flowchart illustrating an example of the processing for calculating the inclination angle in the control system 300 according to the second embodiment.

First, the PLC 140 starts control of the inclination measuring devices 1a to 1c (S31). Each of the inclination measuring devices 1a to 1c sets a plurality of spots on the measurement surface, which are irradiated with light rays from each of the sensor heads 30a to 30c (S32). Subsequently, each of the inclination measuring devices 1a to 1c irradiates the plurality of spots set in S32 with the irradiated light rays from the light source 10 provided therein by using each of the sensor heads 30a to 30c (S33). The processing then goes to S34.

In S34, the PLC 140 determines whether or not each of the inclination measuring devices 1a to 1c has completed acquisition of the distance $d_i$ from the light receiving surface to each spot on the measurement surface in each of the sensor heads 30a to 30c (S34). When determining that the acquisition has been completed (YES in S34), the PLC 140 determines whether or not each of the inclination measuring devices 1a to 1c has completed acquisition of the distances $d_i$ to all the spots (S35). When determining that the acquisition has not been completed (NO in S35), the PLC 140 controls and causes each of the inclination measuring devices 1a to 1c to stop irradiating the current spot with a light ray and start irradiating the next spot (S36). The processing then goes to S34 again. On the other hand, when determining that acquisition has been completed (YES in S35), the PLC 140 calculates an inclination angle in the x-axis direction (S37) and further calculates an inclination angle in the y-axis direction by using a method similar to that in the above first embodiment (S38).

By the above processing, the control system 300 can calculate the distance $d_i$ by using each of the inclination measuring devices 1a to 1c, and further calculate the respective inclination angles in the x-axis direction and the y-axis direction of the measurement surface.

(Flow of Position Control Processing)

Figure 16:
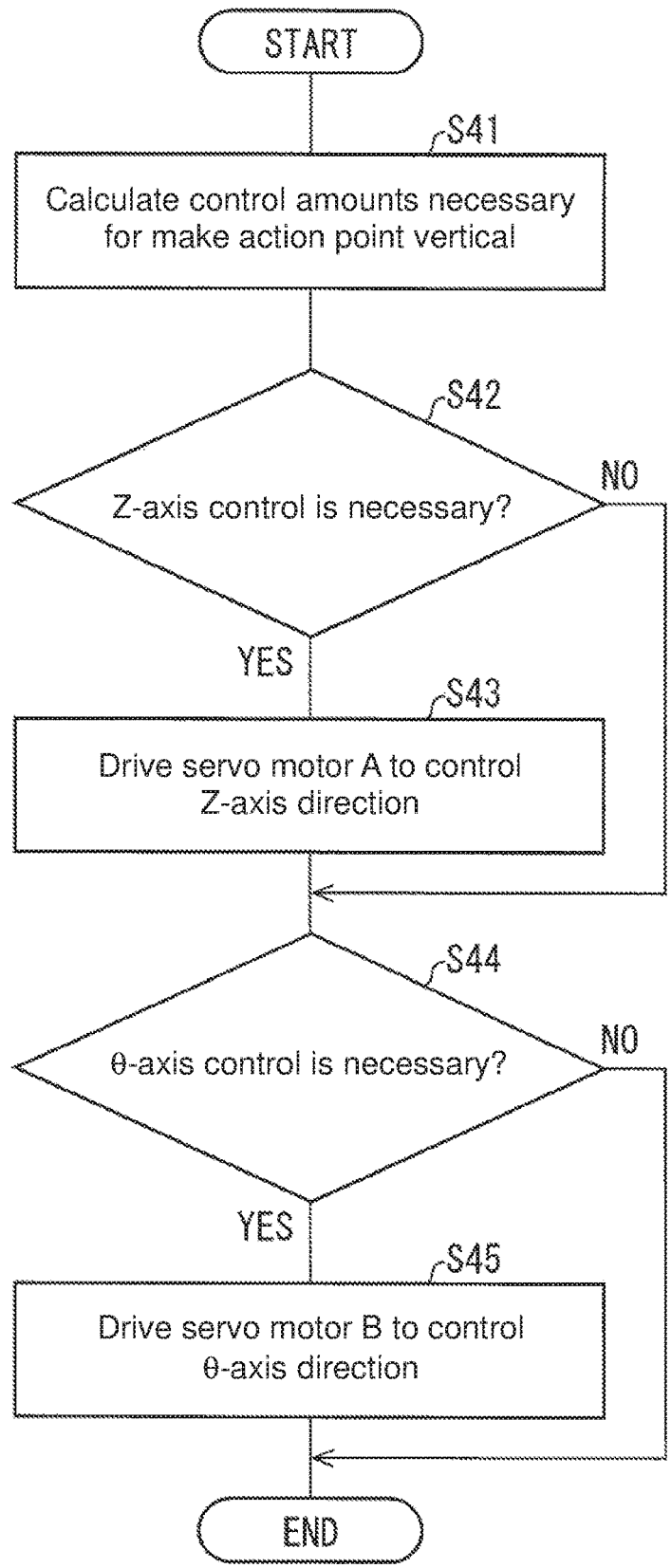
FIG. 16 is a flowchart illustrating an example of processing for making an action point disposed vertical to the measurement surface based on the inclination angle calculated in the control system according to the second embodiment of the present invention.

The flow of the processing executed by the control system 300 according to the second embodiment will be described with reference to FIG. 16. FIG. 16 is a flowchart illustrating an example of processing for making the action point 160 disposed vertical to the measurement surface based on the calculated inclination angle θ in the control system 300 according to the second embodiment. In the following description, it is assumed that the vertical direction to the measurement surface is a z-axis direction, and the servo motor 120a is configured so as to drive the action point 160 in the vertical direction. Meanwhile, it is assumed that the same direction as the inclination angle θ is a θ-axis direction, and a servo motor 120b is configured so as to drive the action point 160 in the θ-axis direction.

First, the PLC 140 calculates a control amount for each of the servo motors 120a and 120b which is required for making the action point 160 vertical to the measurement surface (S41). For example, at the time of driving the servo motor 120b, when the action point 160 comes into contact with the measurement surface, the PLC 140 performs drive control in the z-axis direction by driving the servo motor 120a to make the action point 160 away from the measurement surface. When the inclination angle θ is not 0, the PLC 140 drives the servo motor 120b such that the inclination angle θ=0.

Next, the PLC 140 determines whether or not the drive control in the z-axis direction is necessary (S42). When determining that the drive control is necessary (YES in S42), the PLC 140 transmits a control command to the servo driver 130a, thereby driving the servo motor 120a to control the operation of the action point 160 in the z-axis direction (S43). The processing then goes to S44. On the other hand, when the PLC 140 determines that the drive control in the z-axis direction is unnecessary (NO in S42), the processing directly goes to S44.

In S44, the PLC 140 determines whether or not the drive control in the θ-axis direction is necessary (S44). When determining that the drive control is necessary (YES in S44), the PLC 140 transmits a control command to the servo driver 130b, thereby driving the servo motor 120b to control the operation of the action point 160 in the θ-axis direction (S45). On the other hand, when the PLC 140 determines that the drive control in the θ-axis direction is unnecessary (NO in S44), a series of processing is ended.

By the above processing, based on the calculated inclination angle θ of the measurement surface, the control system 300 can correct the inclination angle θ such that the action point 160 is vertical to the measurement surface.

Thus, by using the inclination measuring devices 1a to 1c and the position control device 200, the control system 300 according to the second embodiment can calculate the inclination angle of the measurement surface of the measurement object 2. Further, by using the position control device 200, the control system 300 can control the positional relation between the action point 160 and the measurement surface so as to cancel the calculated inclination angle. It is thereby possible to dispose the action point 160 always vertical to the measurement surface. Accordingly, it is possible to always process the measurement surface from the vertical direction by using, for example, a machine tool disposed parallel to an optical axis of an irradiated light ray.

Note that in the second embodiment, the inclination measuring devices 1a to 1c may be any devices so long as being configured such that the inclination angle of the measurement surface can be calculated by using all of these. For example, the inclination measuring devices 1a to 1c may be configured such that each of different spots on the measurement surface may be irradiated with only one of irradiated light rays from the sensor heads 30a to 30c. With such a configuration, each of the inclination measuring devices 1a to 1c cannot singly calculate the inclination angle of the measurement surface, but in combination of these, the inclination angle can be calculated. Further, any configuration may be employed so long as the inclination angle of the measurement surface can be calculated by using the sensor heads 30a to 30c. For example, one inclination measuring device 1 may be configured to be optically connected with all of the sensor heads 30a to 30c, and calculate the inclination angle of the measurement surface against the optical axis of each of the sensor heads based on a reflected light ray received in the corresponding sensor head.

Third Embodiment

Hereinafter, a third embodiment of the present invention will be described with reference to FIG. 13.

(Configuration of Control System)

A configuration of a control system 300 according to the second embodiment will be described with reference to FIG. 13. A basic configuration of the control system 300 according to the third embodiment is similar to that of the above second embodiment, but part of the configuration is different. In the third embodiment, a PLC 140 can acquire an inclination angle θ of the measurement surface of a measurement object 2 together with a relative position on the measurement surface. Further, the PLC 140 can acquire the inclination angle θ of the measurement surface and the relative position on the measurement surface with respect to each of a plurality of positions on the measurement surface. A PC 150 can then create a profile of the inclination angle of the measurement object 2 based on the inclination angle θ of the measurement surface against the optical axis of each of the sensor heads 30a to 30c calculated for the plurality of spots on the measurement surface by the PLC 140. Note that the PC 150 may create the profile, or the PLC 140 may create the profile. Further, inclination measuring devices 1a to 1c may be configured such that a processor 50 creates the profile and the PLC 140 collects the created profile.

With the above configuration, the inclination measuring device can create the profile of the inclination angle for the measurement surface. The user can thereby perform a variety of processing on the measurement surface based on the profile. For example, the user can precisely process the measurement surface.

Others

In the above second and third embodiments, the position control device 200 is configured to fix the measurement object 2 and drive the entire casing 100 including the action point 160 to correct the inclination angle θ. However, the position control device 200 may have any configuration so long as being able to correct the inclination angle θ. For example, the actuator 110 and the servo motor 120 may be configured so as to fix the entire casing 100 including the action point 160 and change the relative position of the measurement object 2.

In the above third embodiment, the control system 300 is configured to create the profile of the inclination angle of the measurement object 2. However, it may be configured such that the user can provide an instruction to the control system 300 based on the created profile. For example, it may be configured such that the PC 150 is provided with a touch panel, and can control the position of the action point 160 in accordance with contents inputted by the user on the profile displayed on the touch panel.

Examples of Achievement by Software

The control block (especially the processor 50) of the inclination measuring device 1 may be achieved by a logic circuit (hardware) formed in an integrated circuit (IC chip) or the like, or may be achieved by software by using a CPU (Central Processing Unit).

In the latter case, the inclination measuring device 1 is provided with a CPU for executing a command of a program being software for achieving each function, a ROM (Read Only Memory) or a storage device (hereinafter referred to as a "record medium") in which the above program and a variety of pieces of data are recorded readably by the computer (or the CPU), a RAM (Random Access Memory) for developing the above program, and the like. The computer (or the CPU) then reads the above program from the record medium and executes the program to achieve the object of the present invention. As the record medium, a "non-transitory tangible medium" can be used, such as a tape, a disk, a card, a semiconductor memory, or a programmable logic circuit. The above program may be supplied to the computer via a freely selected transmission medium (communication network, broadcast wave, etc.) capable of transmitting the program. Note that one aspect of the present invention can be achieved also in the form of a data signal embedded in a broadcast wave, which is realization of the program by electronic transmission.

The present invention is not restricted to each of the embodiments described above, but can be subjected to a variety of changes in the scope shown in the claims. An embodiment obtained by appropriately combining technical units disclosed respectively in different embodiments is also included in a technical scope of the present invention.

SUMMARY

An inclination measuring device (1) according to a first aspect of the present invention includes: a light source (10); an optical system (sensor head 30) disposed with respect to an irradiated light ray from the light source, and configured to irradiate a measurement object (2) with the irradiated light ray and receive a light ray reflected from a measurement surface of the measurement object; a light receiving unit (40) including at least one spectroscope (42) configured to separate the reflected light ray received by the optical system into wavelength components, and a detector (44) having a plurality of light receiving elements corresponding to directions of the light rays separated by the spectroscope; a light guide (20) including a plurality of cores and configured to optically connect between the optical system and the light receiving unit; and a processor (50) configured to calculate an inclination angle of the measurement surface against an optical axis of the irradiated light ray based on reflected light rays from a plurality of positions on the measurement surface with respect to a plurality of irradiated light rays with which the plurality of positions are irradiated.

With the above configuration, the inclination measuring device can calculate an inclination angle of the measurement surface based on reflected light rays from a plurality of positions on the measurement surface. Hence the inclination measuring device can perform appropriate measurement in view of inclination of the measurement surface in measurement of the measurement object. Accordingly, it is possible to produce the effect of being able to provide an inclination measuring device with excellent convenience concerning measurement of the measurement object.

In an inclination measuring device (1) according to a second aspect of the present invention, in the above first aspect, it may be configured such that the processor (50) calculates the inclination angle of the measurement surface based on distances between the respective plurality of positions and a light receiving surface of the optical system (sensor head 30) with respect to the reflected light rays from the respective plurality of positions, and a relative distance between the plurality of cores as to the plurality of irradiated light rays with respect to the plurality of positions.

With the above configuration, by irradiating a plurality of positions on the measurement surface with light rays, the inclination measuring device can calculate the inclination angle from a distance between each of the plurality of positions and the light receiving surface of the optical system and relative positions of the cores as to the irradiated light rays.

In an inclination measuring device (1) according to a third aspect of the present invention, in the above first or second aspect, it may be configured such that, when the inclination angle of the measurement surface is larger than or equal to a predetermined threshold, the processor (50) notifies a user that the inclination angle is larger than or equal to the predetermined threshold.

With the above configuration, the user can see whether or not the inclination angle of the measurement surface is larger than or equal to the predetermined threshold. This enables the user to determine whether or not the measurement object is set in a state suitable for measurement. Accordingly, it is possible to produce the effect of being able to provide an inclination measuring device with excellent convenience, capable of performing measurement by adjusting the measurement object into a state suitable for measurement, concerning measurement of the measurement object.

In an inclination measuring device (1) according to a fourth aspect of the present invention, in the above third aspect, it may be configured such that, when detected values in the plurality of light receiving elements are smaller than a predetermined lower limit, the processor (50) notifies the user that the inclination angle is larger than or equal to the predetermined threshold.

With the above configuration, the user can see whether or not the inclination angle of the measurement surface is larger than or equal to the predetermined threshold, and whether or not the detected values in the plurality of light receiving elements are smaller than the predetermined lower limit. Accordingly, for example, in a case where the inclination angle of the measurement surface is determined to be larger than or equal to the predetermined threshold in the measurement result, when the detected values in the plurality of light receiving elements are low, the user can estimate that the intensity of the reflected light rays in the measurement is low and the credibility of the measurement result is low. In such a case, the user can ignore the measurement result. Accordingly, it is possible to produce the effect of being able provide an inclination measuring device with excellent convenience which allows the user to estimate credibility of a measurement result based on the intensity of reflected light rays, concerning measurement of the measurement object.

In an inclination measuring device (1) according to a fifth aspect of the present invention, in any of the above first to fourth aspects, it may be configured such that the light guide (20) includes a plurality of cores in one cable, and the inclination angle is calculated based on relative positions of the plurality of cores.

With the above configuration, the relative positions of the plurality of cores can be made small. Thereby, the inclination measuring device can calculate an inclination angle of a fine region on the measurement surface, which corresponds to the relative positions of the plurality of cores. Accordingly, it is possible to produce the effect of being able to provide an inclination measuring device with improved convenience, capable of accurately measuring the inclination angle on the measurement surface of the measurement object.

In an inclination measuring device (1) according to a sixth aspect of the present invention, in the above fifth aspect, it may be configured such that the plurality of cores are optically connected to a respective plurality of the light sources (10a to 10d), and the processor (50) causes the plurality of light sources to emit light rays sequentially one by one to irradiate the plurality of positions on the measurement surface with the irradiated light rays via the plurality of cores corresponding to the respective plurality of light sources.

With the above configuration, the irradiated light rays each via one core are sequentially projected one by one to the measurement surface of the measurement object. Accordingly, it is possible to perform measurement with reduced interference between a plurality of irradiated light rays via a plurality of cores.

An inclination measuring device (1) according to a seventh aspect of the present invention, in the above fifth aspect, further includes a selection unit (multiplexer 12) capable of selectively providing the irradiated light ray from the light source (10) to each of the respective plurality of cores included in the light guide (20), and in the inclination measuring device, it may be configured such that the processor (50) irradiates each of the plurality of positions on the measurement surface with the irradiated light ray via the core selected by using the selection unit.

With the above configuration, the irradiated light rays each via one core, selected by the selection unit, are sequentially projected one by one to the measurement surface of the measurement object. Accordingly, it is possible to perform measurement with reduced interference between a plurality of irradiated light rays via a plurality of cores.

An inclination measuring device (1) according to an eighth aspect of the present invention, in the above fifth aspect, includes a plurality of the light receiving units (40a to 40d), and in the inclination measuring device, it may be configured such that the plurality of light receiving units are connected one-to-one with the plurality of cores, and the processor (50) calculates distances between the respective plurality of positions and the light receiving surface of the optical system (sensor head 30) with respect to the reflected light rays from the respective plurality of positions based on detected values of the plurality of light receiving elements in the plurality of detectors (42a to 42d) provided in the respective plurality of light receiving units.

With the above configuration, the detector can detect only a reflected light ray via the core corresponding one-to-one to itself. Accordingly, it is possible to reduce interference between reflected light rays as compared with the case of detecting a plurality of reflected light rays via a plurality of cores by using one detector.

In an inclination measuring device (1) according to a ninth aspect of the present invention, in the above fifth aspect, it may be configured such that the plurality of light receiving elements are two-dimensionally disposed on a detection surface of the detector (44), and the processor (50) calculates distances between the respective plurality of positions and the light receiving surface of the optical system (sensor head 30) with respect to the reflected light rays from the respective plurality of positions based on detected values of the plurality of light receiving elements.

With the above configuration, the detector can detect relative positions of a plurality of cores based on peaks of detected values of the plurality of reflected light rays via the plurality of cores in the plurality of two-dimensionally disposed light receiving elements. Accordingly, it is possible to produce the effect of being able to provide an inclination measuring device which, even when interference between a plurality of reflected light rays occurs, can detect relative positions of a plurality of cores and calculate the inclination angle based on the relative positions.

An inclination measuring device (1a to 1c) according to a tenth aspect of the present invention, in any of the above first to fourth aspects, includes a plurality of the optical systems (sensor heads 30a to 30c), and in the inclination measuring device, it may be configured such that the processor (50) calculates the inclination angle of the measurement surface against the optical axis based on the reflected light rays received in the plurality of optical systems.

With the above configuration, it is possible to calculate the inclination angle on the measurement surface of the measurement object with respect to each of the plurality of optical systems.

In an inclination measuring device (1) according to an eleventh aspect of the present invention, in any of the above first to tenth aspects, it may be configured such that based on the inclination angle of the measurement surface against the optical axis, calculated for each of the plurality of positions on the measurement surface, the processor (50) creates a profile of the inclination angle.

With the above configuration, the inclination measuring device can create the profile of the inclination angle for the measurement surface. The user can thereby perform a variety of processing on the measurement surface based on the profile. For example, the user can precisely process the measurement surface.

A control system (300) according to a twelfth aspect of the present invention may be configured to include: the inclination measuring device (1) according to any of the above first to eleventh aspects; and a position control device (200) configured to control a placement relation between an action point that acts on the measurement surface and the measurement surface so as to cancel the inclination angle calculated in the inclination measuring device.

With the above configuration, when the inclination measuring device calculates the inclination angle of the measurement surface of the measurement object, the position control device can control the positional relation between the inclination measuring device and the measurement surface of the measurement object so as to cancel the inclination angle. It is thereby possible to dispose the optical system always vertical to the measurement surface. Accordingly, it is possible to always process the measurement surface from the vertical direction by using, for example, a machine tool disposed parallel to an optical axis of an irradiated light ray.

The invention claimed is:

1. An inclination measuring device comprising:
 a plurality of light sources;
 an optical system disposed with respect to an irradiated light ray from the plurality of light sources, and configured to irradiate a measurement object with the irradiated light ray and receive a reflected light ray from a measurement surface of the measurement object;
 a light receiving unit comprising at least one spectroscope configured to separate the reflected light ray received by the optical system into wavelength components, and a detector comprising a plurality of light receiving elements corresponding to directions of light rays separated by the spectroscope;

a light guide comprising a plurality of cores in one cable and configured to optically connect the optical system and the light receiving unit; and a processor configured to calculate an inclination angle of the measurement surface against an optical axis of the irradiated light ray based on reflected light rays from a plurality of positions on the measurement surface with respect to a plurality of irradiated light rays with which the plurality of positions are irradiated, and based on relative positions of the plurality of cores, wherein the plurality of cores are respectively optically connected to the plurality of light sources, and the processor causes the plurality of light sources to emit rays sequentially one by one to irradiate the plurality of positions on the measurement surface with the irradiated light rays via the plurality of cores corresponding to the respective plurality of light sources.

2. The inclination measuring device according to claim 1, wherein the processor calculates the inclination angle of the measurement surface based on respective distances between the plurality of positions and a light receiving surface of the optical system, calculated based on the reflected light rays from the plurality of positions, and a relative distance between the plurality of cores corresponding to the plurality of irradiated light rays with respect to the plurality of positions.

3. The inclination measuring device according to claim 1, wherein, in response to the inclination angle of the measurement surface being larger than or equal to a predetermined threshold, the processor notifies a user that the inclination angle is larger than or equal to the predetermined threshold.

4. The inclination measuring device according to claim 3, wherein, in response to detected values in the plurality of light receiving elements being smaller than a predetermined lower limit, the processor notifies the user that the inclination angle is larger than or equal to the predetermined threshold.

5. The inclination measuring device according to claim 1, further comprising a selection unit configured to selectively provide the irradiated light ray from the light source to each of the respective plurality of cores included in the light guide, wherein the processor irradiates each of the plurality of positions on the measurement surface with the irradiated light ray via a core selected by the selection unit.

6. The inclination measuring device according to claim 1, comprising a plurality of the light receiving units, wherein the plurality of light receiving units are connected one-to-one with the plurality of cores, and the processor calculates respective distances between the plurality of positions and a light receiving surface of the optical system with respect to the reflected light rays from the plurality of positions based on detected values of the plurality of light receiving elements in a plurality of detectors provided in the respective plurality of light receiving units.

7. The inclination measuring device according to claim 1, wherein the plurality of light receiving elements are two-dimensionally disposed on a detection surface of the detector, and the processor calculates respective distances between the plurality of positions and the light receiving surface of the optical system with respect to the reflected light rays from the respective plurality of positions based on detected values of the plurality of light receiving elements.

8. The inclination measuring device according to claim 1, comprising a plurality of the optical systems, wherein the processor calculates the inclination angle of the measurement surface against the optical axis based on the reflected light ray received in each of the plurality of optical systems.

9. The inclination measuring device according to claim 1, wherein, the processor creates a profile of the inclination angle based on the inclination angle of the measurement surface against the optical axis, calculated for each of the plurality of positions on the measurement surface.

10. A control system comprising:

the inclination measuring device according to claim 1; and a position control device configured to control a placement relation between an action point that acts on the measurement surface and the measurement surface so as to cancel the inclination angle calculated in the inclination measuring device.

* * * * *